US012576767B2

(12) United States Patent
Cole et al.

(10) Patent No.: US 12,576,767 B2
(45) Date of Patent: Mar. 17, 2026

(54) REDUCTION OF COIL COMPRESSION IN EXCITER-BASED SEAT MASSAGE SYSTEM

(71) Applicant: Leggett & Platt Canada Co., Halifax (CA)

(72) Inventors: Shane Cole, Windsor (CA); Maxime Samain, Harelbeke (BE)

(73) Assignee: Leggett & Platt Canada Co., Halifax (CA)

( * ) Notice: Subject to any disclaimer, the term of this patent is extended or adjusted under 35 U.S.C. 154(b) by 216 days.

(21) Appl. No.: 18/416,504

(22) Filed: Jan. 18, 2024

(65) Prior Publication Data

US 2024/0246469 A1    Jul. 25, 2024

Related U.S. Application Data

(60) Provisional application No. 63/480,867, filed on Jan. 20, 2023.

(51) Int. Cl.
B60N 2/90          (2018.01)
(52) U.S. Cl.
CPC .................................... B60N 2/976 (2018.02)
(58) Field of Classification Search
CPC .... B60N 2002/981; B60N 2/976; B60N 2/90; B60N 2/70; B60N 2/24; B60N 2/5657; A61H 2201/0149
See application file for complete search history.

(56) References Cited

U.S. PATENT DOCUMENTS

| | | | |
|---|---|---|---|
| 4,005,703 A | 2/1977 | Rosen et al. | |
| 4,641,345 A | 2/1987 | Takahashi | |
| 4,750,208 A | 6/1988 | Yamada et al. | |
| 5,348,370 A | 9/1994 | Fukuoka | |
| 5,387,026 A | 2/1995 | Matsuhashi et al. | |
| 5,713,832 A | 2/1998 | Jain | |
| 5,875,255 A | 2/1999 | Campbell | |
| 6,682,494 B1 | 1/2004 | Sleichter, III et al. | |
| 6,847,139 B2 | 1/2005 | Ueda et al. | |
| 7,050,593 B1 | 5/2006 | Emerling et al. | |
| 7,334,839 B1 * | 2/2008 | Malerba .................. | B60N 2/062 297/217.3 |
| 7,418,108 B2 | 8/2008 | Oser | |
| 9,685,848 B2 | 6/2017 | Song et al. | |
| 10,532,682 B2 | 1/2020 | Kono | |

(Continued)

FOREIGN PATENT DOCUMENTS

| | | |
|---|---|---|
| CN | 103830087 A | 6/2014 |
| CN | 204383235 U | 6/2015 |

(Continued)

OTHER PUBLICATIONS

International Search Report and Written Opinion for Application No. PCT/CA2025/050633 dated Aug. 1, 2025 (21 pages).

(Continued)

*Primary Examiner* — Shin H Kim

(74) *Attorney, Agent, or Firm* — Michael Best & Friedrich LLP

(57)          ABSTRACT

An assembly for massaging an occupant of a seat includes an exciter and a carrier. The exciter has a coil for creating a vibration. The carrier retains the exciter within the seat. The carrier allows for operation of the coil that is isolated from forces resulting from the occupant sitting in the seat.

18 Claims, 16 Drawing Sheets

(56) References Cited

U.S. PATENT DOCUMENTS

| | | | |
|---|---|---|---|
| 10,609,488 B1 | 3/2020 | Concessi | |
| 10,674,267 B1 | 6/2020 | Guidetti et al. | |
| 10,703,243 B2 | 7/2020 | David et al. | |
| 10,940,872 B2 | 3/2021 | Alexiou et al. | |
| 11,135,950 B2 | 10/2021 | Migneco et al. | |
| 11,524,613 B2* | 12/2022 | Duncan | B60N 2/5657 |
| 11,673,498 B2 | 6/2023 | Bennis | |
| 2002/0090106 A1 | 7/2002 | Guenther | |
| 2006/0015045 A1 | 1/2006 | Zets et al. | |
| 2006/0036201 A1 | 2/2006 | Cohen | |
| 2008/0129094 A1 | 6/2008 | Nakajima | |
| 2009/0250982 A1 | 10/2009 | Cohen | |
| 2009/0295202 A1 | 12/2009 | Takada et al. | |
| 2011/0068611 A1 | 3/2011 | Maeda | |
| 2013/0107216 A1 | 5/2013 | Haight et al. | |
| 2013/0119729 A1* | 5/2013 | Neyrinck | B60N 2/976 |
| | | | 297/217.3 |
| 2014/0015293 A1* | 1/2014 | Pellenz | A61H 23/04 |
| | | | 297/217.3 |
| 2016/0129920 A1 | 5/2016 | Hall et al. | |
| 2016/0323674 A1 | 11/2016 | Porter et al. | |
| 2019/0118684 A1 | 4/2019 | Noguchi et al. | |
| 2019/0202331 A1 | 7/2019 | Cimatti | |
| 2020/0114791 A1 | 4/2020 | Nakano et al. | |
| 2020/0122619 A1 | 4/2020 | Fujikake et al. | |
| 2020/0184822 A1 | 6/2020 | Fukuda et al. | |
| 2021/0300224 A1* | 9/2021 | Tait | B60N 2/56 |
| 2022/0012991 A1 | 1/2022 | Fenner, Jr. | |
| 2022/0194304 A1 | 6/2022 | Stöwesand et al. | |
| 2022/0198890 A1 | 6/2022 | Kim et al. | |
| 2022/0249322 A1* | 8/2022 | Liu | A61H 7/007 |
| 2022/0332235 A1 | 10/2022 | Soltner et al. | |
| 2022/0340063 A1 | 10/2022 | Soltner et al. | |
| 2022/0340064 A1 | 10/2022 | Soltner et al. | |
| 2022/0378651 A1 | 12/2022 | Palacio | |
| 2023/0191973 A1* | 6/2023 | Migneco | B60N 2/976 |
| | | | 601/148 |
| 2023/0249599 A1 | 8/2023 | Nicola et al. | |
| 2024/0246469 A1* | 7/2024 | Cole | B60N 2/976 |

FOREIGN PATENT DOCUMENTS

| | | |
|---|---|---|
| CN | 114715004 A | 7/2022 |
| DE | 102014216161 A1 | 2/2016 |
| DE | 102019115348 A1 | 12/2020 |
| DE | 102021100410 A1 | 7/2022 |
| EP | 3321127 B1 | 10/2020 |
| EP | 3797880 A1 | 3/2021 |
| EP | 3808458 A1 | 4/2021 |
| JP | S57156711 A2 | 9/1982 |
| JP | 7323068 A2 | 12/1995 |
| JP | 2002346476 A | 12/2002 |
| JP | 2002354567 A | 12/2002 |
| JP | 2011229754 A | 11/2011 |
| JP | 2016068667 A2 | 5/2016 |
| KR | 20060100578 A | 9/2006 |
| KR | 101381641 B1 | 4/2014 |
| KR | 101418944 B1 | 7/2014 |
| KR | 101481740 B1 | 1/2015 |
| KR | 101607526 B1 | 3/2016 |
| KR | 20170075249 A | 7/2017 |
| WO | 2016085301 A1 | 6/2016 |
| WO | 2022091776 A1 | 5/2022 |
| WO | 2022268451 A1 | 12/2022 |

OTHER PUBLICATIONS

International Patent Office Search Report and Written Opinion for Application No. PCT/CA2024/050056 dated Mar. 26, 2024 (7 pages).

* cited by examiner

REDUCTION OF COIL COMPRESSION IN EXCITER-BASED SEAT MASSAGE SYSTEM

PRIORITY CLAIM

This application claims priority to U.S. Provisional Patent Application No. 63/480,867, filed Jan. 20, 2023, the entire contents of which are incorporated herein by reference.

VEHICLE BACKGROUND

Vehicle seats and other seats may include various comfort features including, for example, heating, cooling, and massage. Massage features are commonly implemented using pneumatic bladders. In current systems, bladders located within a seat are inflated and deflated in predefined sequences to impart a massage-like motion to a seated person.

SUMMARY

While pneumatic bladder systems have been commonly used for massage features, such systems are relatively complicated, and their performance is limited by the capabilities and limitations of pneumatic systems.

Instead of using pneumatic bladders, certain examples herein provide, among other things, a massage system that uses the vibrations generated by audio speakers and other types of devices to create a massage-like motion. Such other types of applicable devices that generate vibrations include, for example, speaker coils, eccentric motors, and vibration actuators like those sold by Foster Electric or Dayton Audio, and are collectively referred to herein generally as "exciters." To achieve an optimum and effective massage experience, the exciter coils (e.g., speaker coils) must vibrate properly at their maximum intended amplitude. The exciter coil in this sense refers to the coil assembly (e.g., the wires, magnet assembly, rotor, stator, or other structure), and as used herein does not only refer to a single wire, which could also be interpreted as a coil. One factor that can negatively impact coil vibration, however, is compression of the exciter assembly. For example, if a seated occupant exerts force on the seat, either when initially sitting down or otherwise moving once seated, a compressive force may be applied to the coil of the massage exciters and interfere with their proper vibratory operation or even damage the exciters. In some examples, the vibration amplitude may be diminished or the exciter's vibration motor may stall because the exciter lacks the power to counter the compressive force that may be exerted by a seated occupant. Thus, it is important to provide an exciter-based massage system with structural features that will isolate unwanted compressive forces exerted by a seated occupant and thereby prevent interference with the vibratory operation of the exciter and its coils and possible damage to the exciter.

One example provides an assembly for massaging an occupant of a seat that includes an exciter and a carrier. The exciter has a coil for creating a vibration. The carrier retains the exciter within the seat. The carrier allows for operation of the coil isolated from forces resulting from the occupant sitting in the seat that may compress the coil and limit its ability to vibrate.

Another example provides an assembly for massaging an occupant of a seat that includes, in an aspect combinable with other aspects, a carrier having a plate and a cylindrical projection extending away from the plate. The plate and the cylindrical projection define a cavity for housing an exciter.

Another example provides an assembly for massaging an occupant of a seat that includes, in another aspect combinable with the other aspects set forth in this disclosure, a carrier including a spine, a first mounting bracket, a second mounting bracket, and a plurality of flexible projections. The first mounting bracket is located at a first end of the spine and is configured to receive mounting hardware. The second mounting bracket is located at a second end of the spine that is opposite the first end of the spine. The plurality of projections is spaced along the spine. Each of the plurality of projections includes a mounting region spaced apart from the spine. An exciter is attached to the mounting region of each one of the plurality of projections.

Another example provides an assembly for massaging an occupant of a seat that includes, in another aspect combinable with the other aspects set forth in this disclosure, a carrier and a plurality of exciters. The carrier includes a plate and a plurality of cylindrical projections extending away from the plate. Each of the plurality of exciters is positioned within a respective cavity of each of the plurality of cylindrical projections.

Another example provides an assembly for massaging an occupant of a seat that includes, in another aspect combinable with the other aspects set forth in this disclosure, a carrier including an opening and a membrane. An exciter is retained within the opening by the membrane.

DETAILED DESCRIPTION

Before any embodiments, examples, aspects, and features are explained in detail, it is to be understood that those embodiments, examples, aspects, and features are not limited in their application to the details of construction and the arrangement of components set forth in the following description or illustrated in the following drawings. Other embodiments, examples, aspects, and features are possible and capable of being practiced or of being carried out in various ways. Also, it is to be understood that the phraseology and terminology used herein is for the purpose of description and should not be regarded as limiting.

Figure 1:
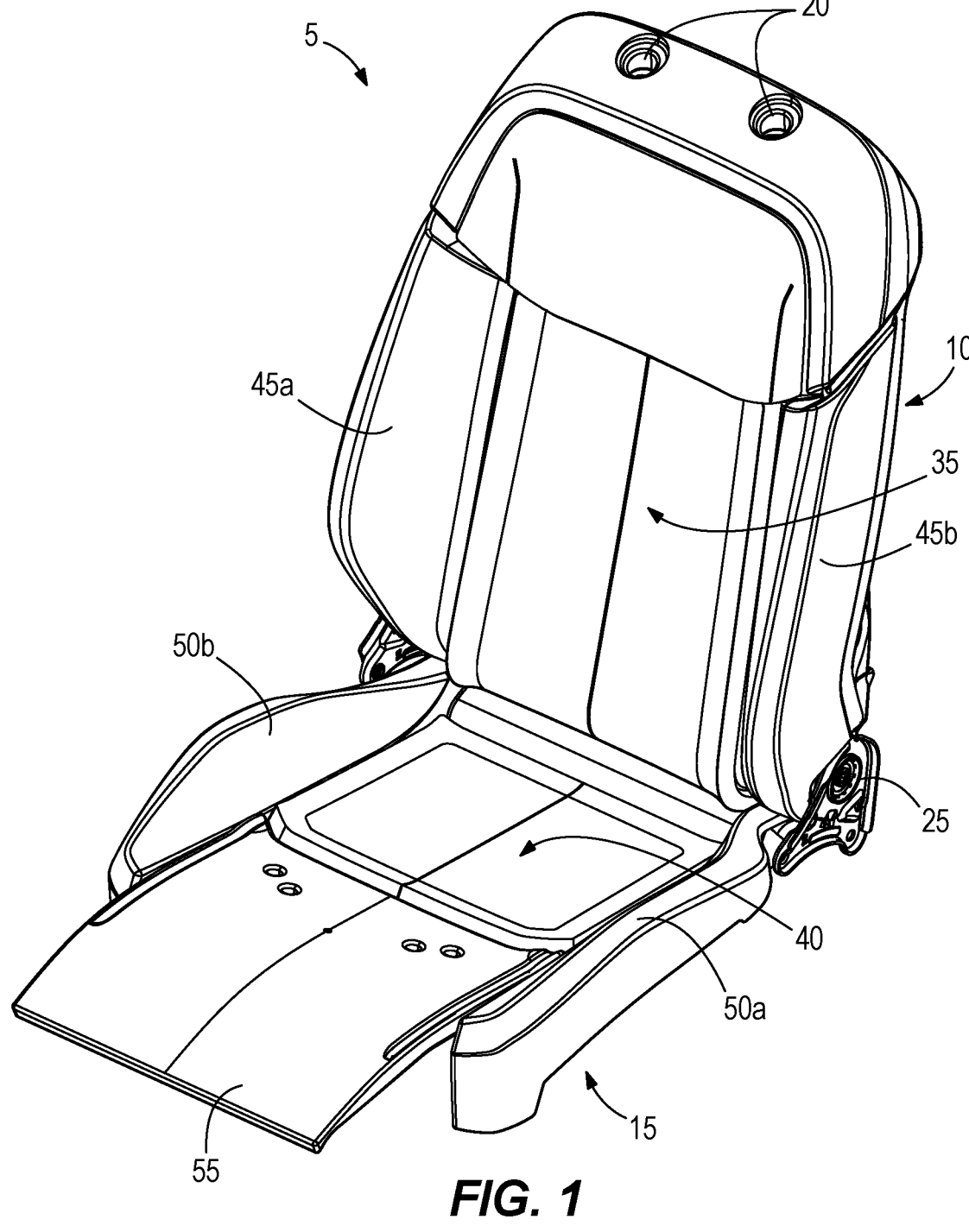
FIG. 1 illustrates a seat including a massaging assembly according to some examples.

FIG. 1 illustrates an example of a massage seat 5 for a vehicle. However, other embodiments of the seat 5 are contemplated. For example, the massage assembly described herein could be implemented in an office seat, gaming seat, or various types of furniture, such as sofas, recliners, beds, and the like. As another example, a massage seat for use in a medical practice, such as a physical therapy clinic, or in a salon, such as a nail or hair salon, is contemplated. When used in a vehicle, the seat 5 can be used for either a driver or passenger. Generally, the side of the seat 5 that faces the seat occupant can be referred to as the A-side, while the side of the seat 5 facing away from the occupant can be referred to as the B-side.

The seat 5 includes a backrest 10 and a base 15. The base 15 in some examples is also referred to as the cushion. The backrest 10 and base 15 are hinged about a seat hinge 25 so that an angle of the backrest 10 relative to the base 15 can be adjusted, for example, by a seated occupant. The backrest 10 can include a headrest positioned at a headrest mounting location 20. When included as part of the seat 5, the headrest extends from the upper side of the backrest 10 opposite the seat hinge 25. The seat 5 can be mounted to a vehicle by seat rails or other mechanisms (not shown) that permit the position of the seat 5 to be adjusted fore and aft relative to the vehicle.

The seat 5 generally includes a backrest seating area 35 and a base seating area 40 to support a seated occupant and provide support surfaces in contact with the occupant. In some instances, seating areas may include additional support features such as, for example, backrest bolsters 45a, 45b, base bolsters 50a, 50b, and base cushion extender 55, all of which are shown in FIG. 1. The backrest bolsters 45a, 45b, the base bolsters 50a, 50b, and the base cushion extender 55 add supporting structure to the seating area to provide additional comfort, usability, or adjustability of the seat for an occupant, and all may provide additional support surfaces in contact with a seated occupant.

Figure 2:
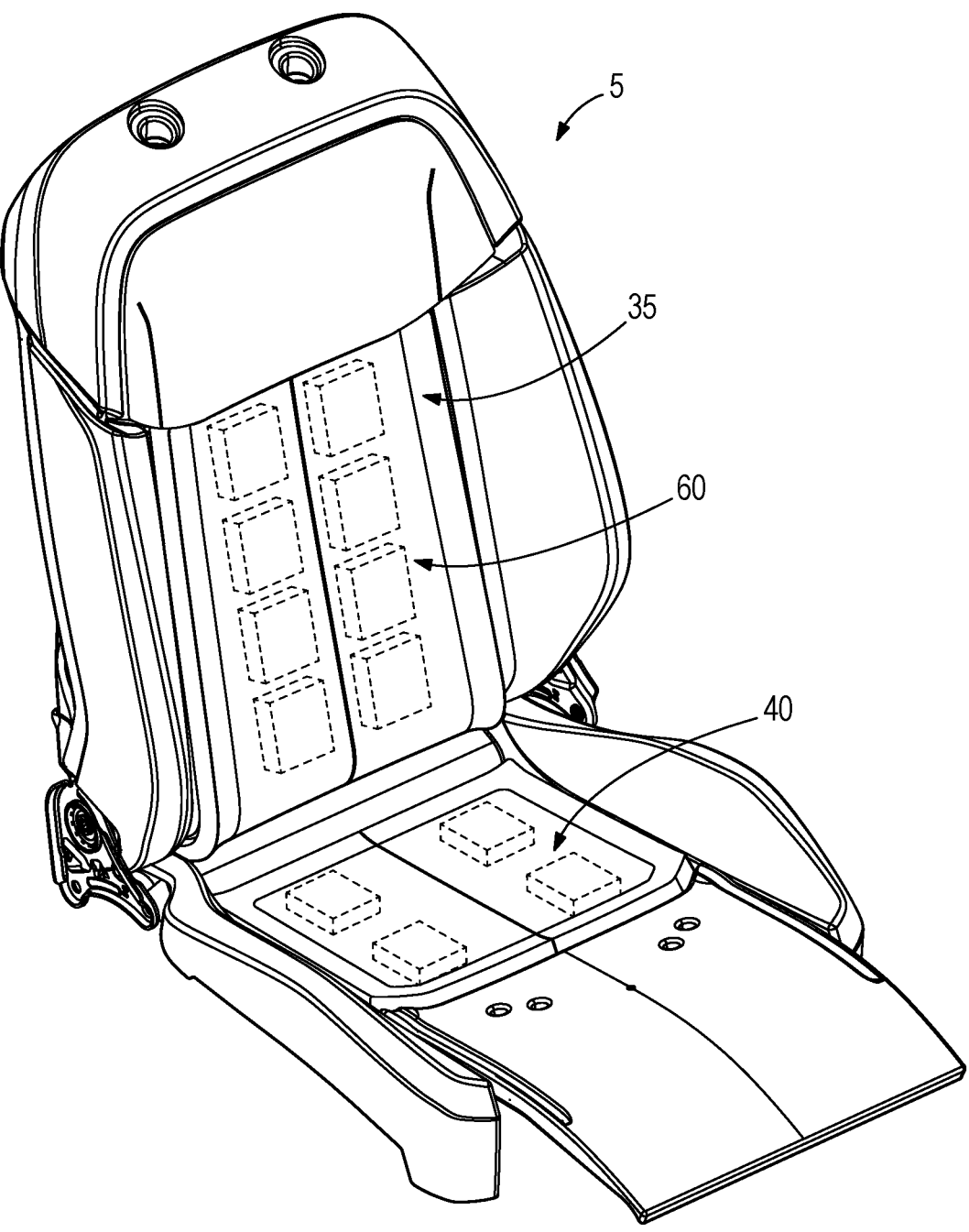
FIG. 2 is a schematic that illustrates the locations of exciters within the seat of FIG. 1 according to some examples.

All or a portion of the backrest seating area 35 and the base seating area 40, including any of the backrest bolsters 45a, 45b, base bolsters 50a, 50b, and base cushion extender 55 shown in FIG. 1, can include a massage element or in some cases a massage system 60. For example, FIG. 2 schematically illustrates the massage system 60 in the backrest 10 and base 15. The massage system 60 is positioned beneath the seat's outer covering, which may comprise, for example, fabric, leather, plastic, or other seat covering material. Thus, the massage system 60 is not visible from the exterior of the seat 5.

The massage system 60 provides massaging vibrations to the seat occupant through the A-side of the backrest and base seating areas 35, 40, respectively. As a result, the massage system 60 is positioned sufficiently close enough beneath the underside of the seat's outer cover on the A-side of the seat so that the seat occupant will feel the massaging vibrations generated by the massage system 60. If the massage system 60 is positioned too far away from the underside of the seat's cover on the A-side of the seat 5, the desired massaging effect will be diminished or not felt at all.

Figure 12:
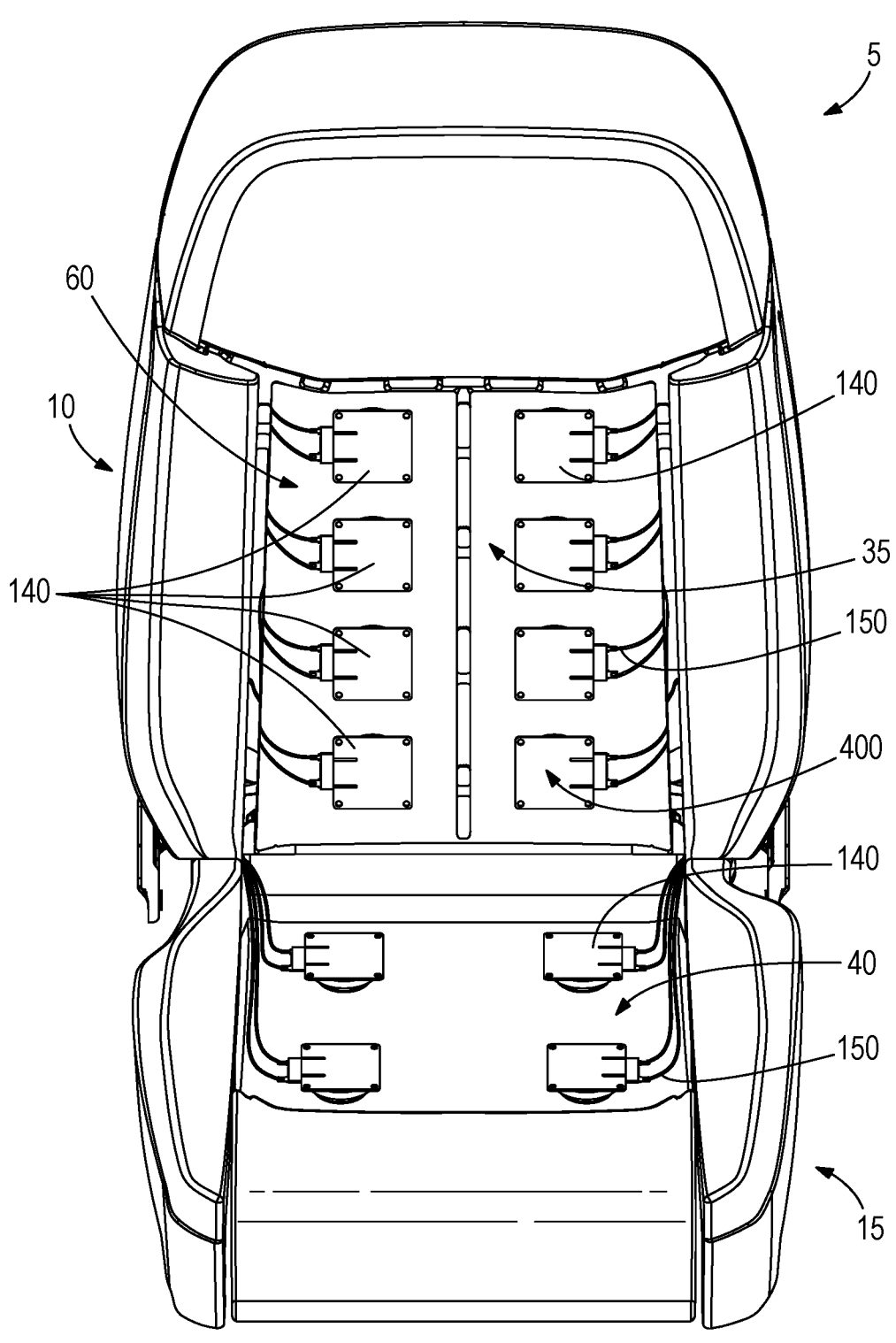
FIG. 12 illustrates a massage system within the seat of FIG. 1 according to some examples.

FIG. 12 illustrates another massage system 60 provided in the backrest and base seating areas 35, 40, respectively. FIGS. 2 and 12 provide only two examples of the possible configurations or layouts of massage system 60, which, depending on the desired user experience, can be provided in virtually any part of the seat 5 that directly supports and is in contact with a seated occupant.

The massage system 60 uses exciters 140 to generate vibrations that massage the occupant of the seat 5. Each exciter includes a coil. In some examples the exciter includes a diaphragm that is reciprocated by the coil. The exciters 140 (shown in FIGS. 7, 8, 12, and 16) may be arranged in different configurations within the seat 5 such that the vibrations generated by the exciters 140 produce different massage effects. In some instances, the number of exciters 140 may be between six and ten. In other instances, the number of exciters is at least four. The exciters may be mounted in the seat 5 such that they are located close to the back or thigh of the seated occupant and avoid directly massaging the occupant's ribs and spine. The locations of the exciters 140 may also be dictated by seating packaging requirements, so that the massage system 60 can be correctly installed within the seat 5.

In some examples, the natural frequency of the massage system 60 is designed to be between 30 Hz and 90 Hz, which has been found to provide a desirable massage experience. The natural frequency of the massage system 60 is a function of the stiffness of the carrier, any seal attached to the carrier, and the occupant's mass. More particularly, the natural frequency is equal to the square root of the stiffness divided by the mass. Thus, the material used to make the carrier can change the natural frequency of the massage system 60. The geometry of the carrier can also change the natural frequency of the massage system 60. As such, in some examples the structure and material of the seal or membrane attaching the exciter to the carrier can be optimized such that the natural frequency of the massage system is between 30 Hz and 90 Hz for seated occupants weighing within a common range, for example 90 to 300 pounds. In other examples, frequencies in a narrower range or in a range outside of 30 Hz and 90 Hz are desirable. More detail is provided below relating to these and other features of the massage systems 60.

The proximity of the exciters 140 to the seated occupant may result in an undesirable compression of the exciters 140 and their coils, as mentioned above, depending on the configuration of the seat and the seated occupant's weight and seating posture. Compression of the exciters 140 can adversely impact their individual performance and the overall performance of the massage system 60, diminishing the system's effectiveness and the massage experience. Carriers 100, 200, 300, 400, and 500 (also often referred to as lumbar baskets) provide examples of structures, which can be manufactured from rubber or hard plastic, that protect the exciters 140 from this unwanted compression.

Figure 3:
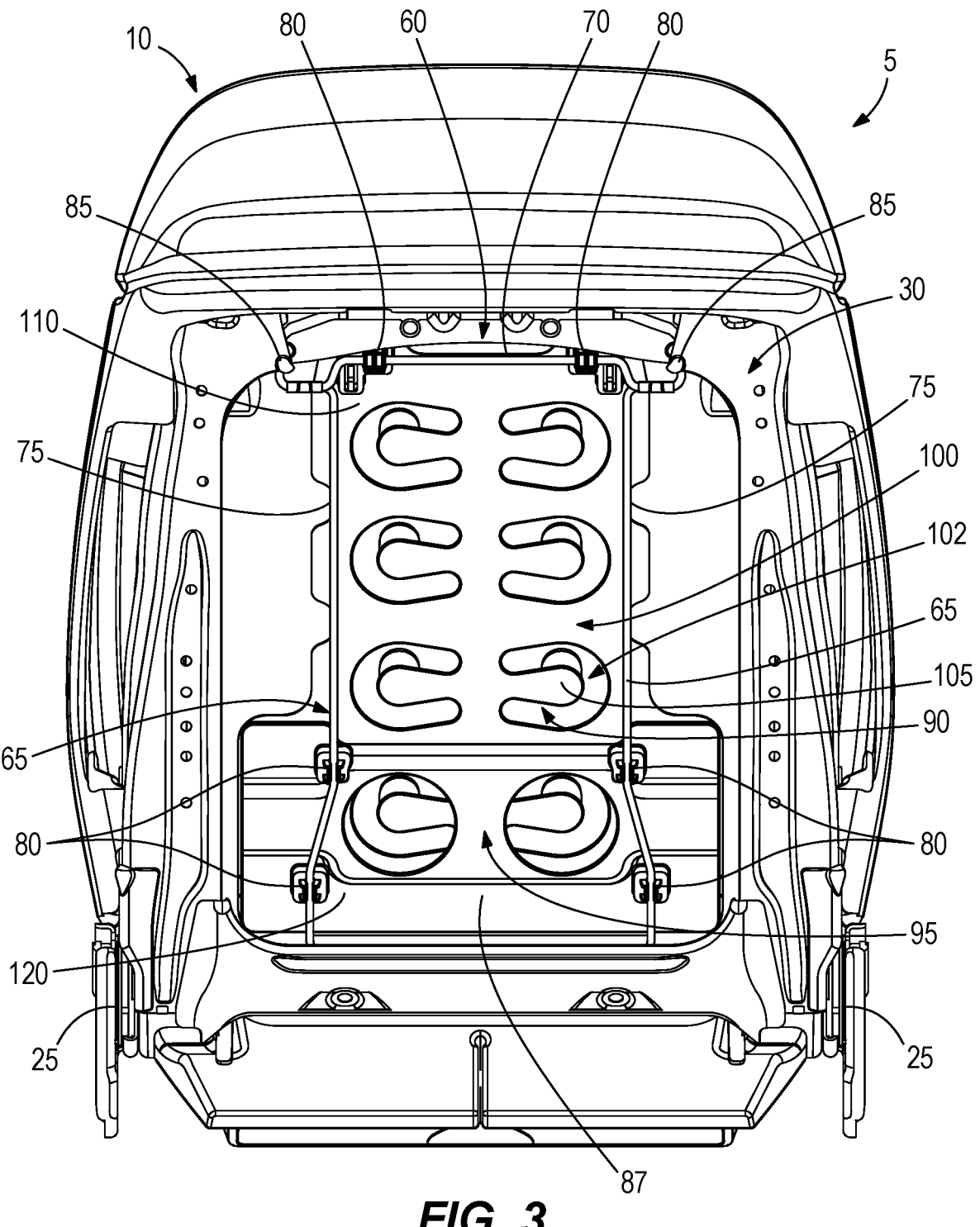
FIG. 3 illustrates a massage system within the seat of FIG. 1 according to some examples.
Figure 4:
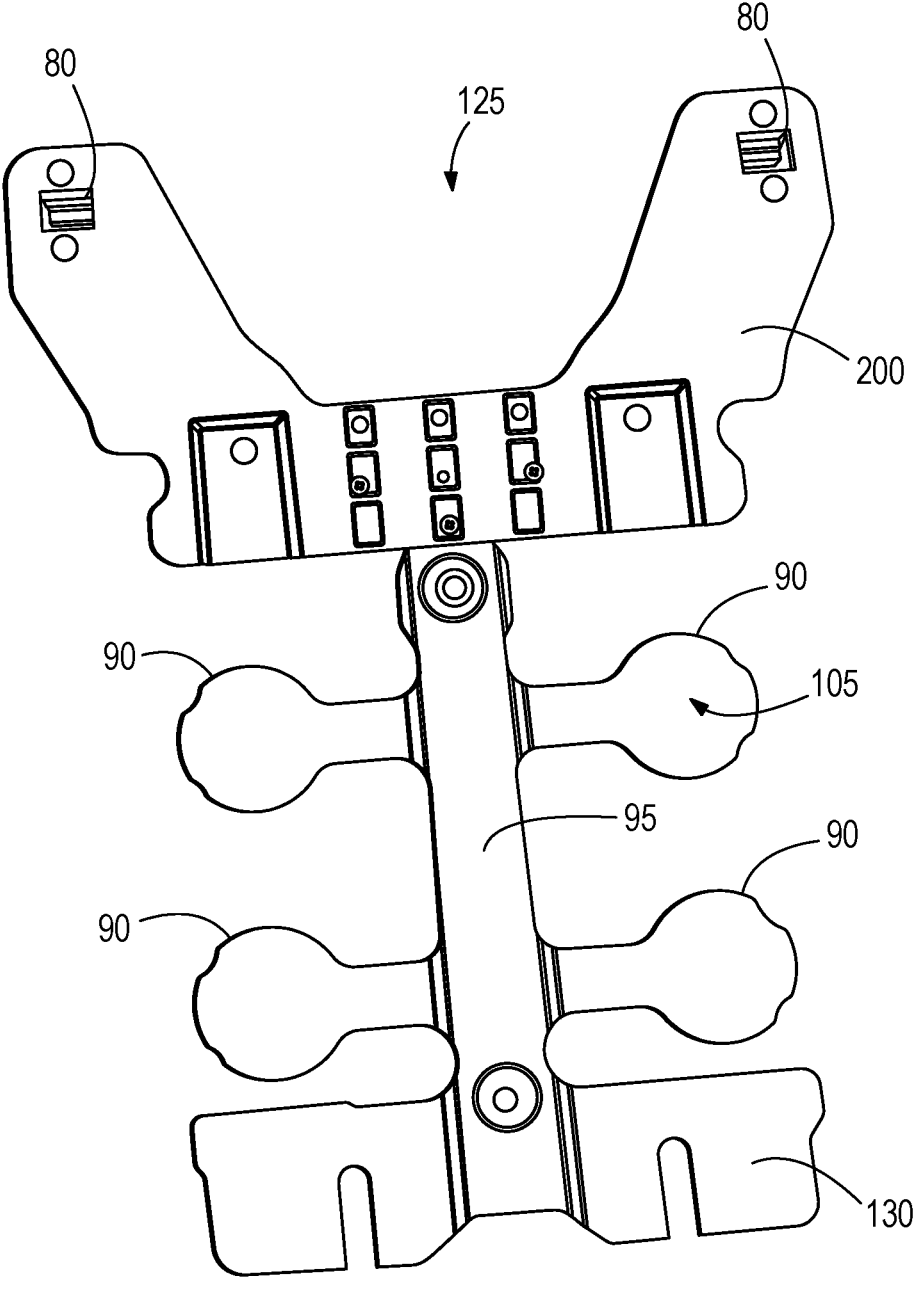
FIG. 4 illustrates an alternate construction of a carrier for the massage system of FIG. 3 according to some examples.
Figure 5:
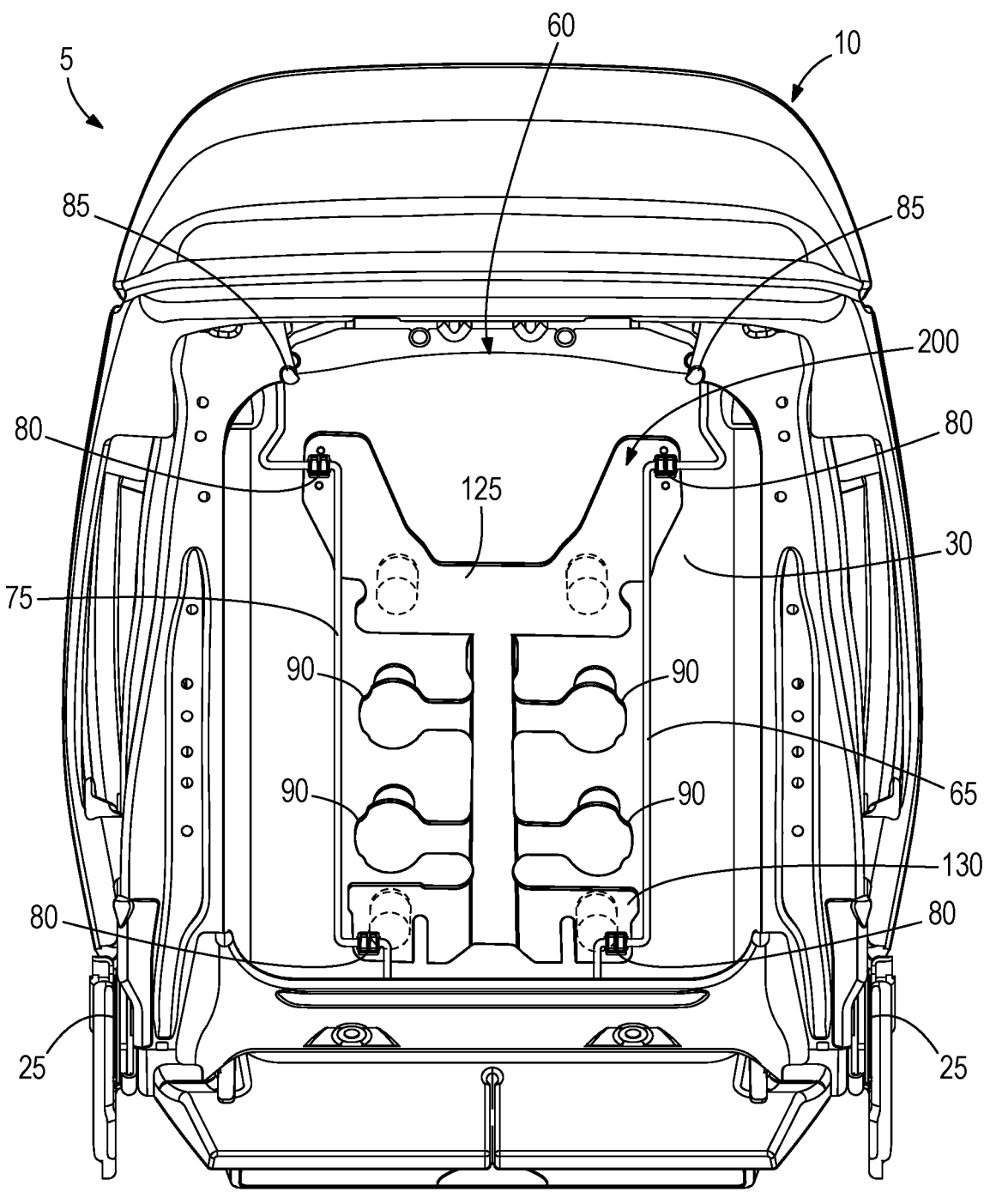
FIG. 5 illustrates a massage system with the carrier of FIG. 4 according to some examples.

As discussed below, isolating the individual exciters from the vibrations of other exciters or other seating and vehicle components also provides an improved massage experience. Mounting each exciter 140 to an individual projection 90 that flexibly extends from a central spine 95 formed as part of a flexible carrier as shown in FIGS. 3-5 provides one example that serves to isolate the individual exciters and their vibrations from each other and other seating/vehicle components. Suspending each exciter within an individual housing cavity 170 by attaching the exciter to the underside of a flexible gasket, seal, or membrane 145 that covers multiple cavity openings formed in a carrier 300 for multiple exciters (FIGS. 6-11) or that individually covers the single cavity openings formed in a carrier 400 for a single exciter (FIGS. 12-15) provides another example of how the exciters can be isolated to provide an improved massage experience. Yet another example shown in FIG. 16 suspends each exciter 140 from a flexible seal or membrane 145 that covers an exciter opening formed in a carrier 500. Each of these examples capitalizes on the isolation and localization of individual exciter vibrations to provide an overall stronger vibratory effect and resulting improved massage experience, while still offering a modular massage system package for easy installation into seat 5.

FIG. 3 illustrates one example of the massage system 60 within the seat 5 of FIG. 1. The view shown in FIG. 3 is a rear view of the backrest 10, with the seat covering removed so that the massage system 60 is visible. The massage system 60 includes a carrier or lumbar basket 100 and a spring 65 (also often referred to as a guidewire). The spring 65 is mounted to the seat frame 30 at seat frame mounting locations 85. Two seat frame mounting locations 85 are shown in FIG. 3 near the top of the backrest 10. The spring 65 is also mounted by at least two additional seat frame mounting locations 85 near the bottom of the backrest 10 that are hidden behind the seat frame 30 in the view of FIG. 3. The seat frame mounting locations 85 shown in FIG. 3 are formed by portions of the spring 65 inserted through the seat frame 30, although other implementations are contemplated such as clips, snaps, or bolts that retain the spring 65 in place relative to the seat frame 30. In other examples, the spring 65 can be configured differently to suspend the plate 87, such as when the packaging requirements of the plate 87 within the seat 5 differ from what is shown herein.

In the example shown in FIG. 3, the spring 65 includes three primary components, a cross beam 70 that extends between the seat frame mounting locations 85 and two spanner beams 75 that extend from the cross beam 70 and down opposite sides of the massage system 60 to an end of the seat frame 30 near the seat hinge 25. The spring 65 is connected to the carrier 100 at spring mounting locations 80. In the example shown in FIG. 3, two spring mounting locations 80 are used and are connected to a plate 87 of the carrier 100. Four additional spring mounting locations 80 connect the spring 65 to a shield 120 of the carrier 87. The two spring mounting locations 80 on the plate 87 are located at an upper portion of the plate 110. Two sets of spring mounting locations 80 are connected to the shield 120. The shield 120 is a rigid structure like the plate 87 and can be made of the same material as the plate 87. The shield 120 is positioned between the spring 65 and the plate 87 and provides a structure into which the plate 87 may be depressed under the weight of a seated occupant. The shield 120 therefore provides additional support to the seated occupant. The shield 120 is shown in more detail in FIG. 11. In other instances, more or fewer spring mounting locations 80 can be provided at different locations on the plate 87 or on the shield 120. The spring mounting locations 80 are shown as snaps that receive the spring 65, but other embodiments are contemplated, such as, for example, fasteners or bolts, that are configured to retain the spring 65 in place relative to the carrier 100. The spring mounting locations are designed in some examples to allow the plate 87 to pivot when lumbar adjustments to the backrest 10 are made by a seated occupant.

The carrier 100 is thus suspended on the seat frame 30 by the spring 65 for independent flexing and movement relative to the frame, which serves to isolate vibrations from the vehicle chassis that would otherwise travel through the seat frame 30 to the massage system 60 and diminish the effectiveness of the massage system 60 and the massage experience. Similarly, suspension of the carrier 100 by the spring 65 also permits the carrier 100 to flex and move relative to a seated occupant and thereby isolate any forces created by the occupant's movements that might interfere with the operation of the massage system 60 and the message experience.

The plate 87 has a plurality of projections or leaves 90, also referred to as fingers in some examples. The projections 90 are cantilevered from a central spine 95 that runs vertically down a middle region of the plate 87 as shown in FIG. 5. The carrier 100 is positioned and configured so that the spine 95 generally aligns with a spine of a seated occupant. Each projection 90 has a rounded mounting region 105 distal from the spine 95. The mounting region 105 of each projection 90 provides an area on which an exciter 140 can be installed using an adhesive. Alternatively, the exciters 140 can be fastened or clipped to the projections 90 using various hardware.

The cantilever design of the projections 90 allows the projections to be pre-loaded so that in a rest state, the projection is biased toward or away from the rest of the plate 87. In other words, for example, the projections can be bent at an angle away from a plane defined by the rest of the plate 87. Pre-loading and biasing the projections 90 can position the exciters 140 relatively close to a seated occupant to provide an effective and satisfactory massage experience while at the same time allow the exciters 140 to flex on projections 90 away from the occupant in response to any compressive forces the occupant may exert on the exciters. Allowing the exciters to flex away from compressive forces created by a seated occupant serves to prevent unwanted compression on the coils of the exciters 140 that would adversely affect exciter operation. In short, the pre-loaded exciter mounting projections 90 serve to position the exciters 140 close to a seated occupant for optimum massage operation while protecting against undesirable compression on the exciter coil or diaphragms resulting from compressive forces exerted by a seated occupant on the enclosed exciter system 60. In response to the dissipation or release of such compressive forces, the memory properties of the biased projections 90 will return the projections 90 to their initial at-rest unbiased positions.

The example shown in FIG. 3 includes eight projections 90, although more or fewer projections 90 can be provided depending on the desired massage experience. Although not shown, the massage system 60 shown in FIG. 3 can be adapted for use in the base 15.

FIG. 4 illustrates an alternate construction of a carrier 200 for the massage system 60 of FIG. 3. The plate 87 of the alternate carrier 200 is different from that shown in FIG. 3 in that the carrier 200 includes first and second mounting brackets 125, 130 with the spine 95 extending between them. The projections or leaves 90 are also different in structure from the projections shown in FIG. 3. The projections 90 in FIG. 4 have a substantially constant cross section extending from the spine 95 to the mounting region 105, which is at the distal end of the projection from the spine 95. Like the projections 90 of the example in FIG. 3, the exciters 140 are attached to the projections 90 at the mounting region 105. While four projections 90 are shown in FIG. 4, more or fewer projections 90 are contemplated.

FIG. 5 illustrates the carrier 200 of FIG. 4 installed into the seat 5. Unlike the example shown in FIG. 3, the carrier 200 in FIG. 5 only includes four spring mounting locations 80, two at the first mounting bracket 125 and two at the second mounting bracket 130. The spring 65 in this example includes two spanner beams 75 and lacks the cross beam 70 shown in FIG. 3. Each spanner beam 75 extends from a portion of the seat frame 30 near the seat hinge 25 (the connection to the seat frame 30 is not shown) to an upper portion of the seat frame 30 farther away from the seat hinge 25. The spanner beams 75 are connected to the seat frame 30 at seat frame mounting locations 85. The first and second mounting brackets 125, 130 are connected to the spring 65 such that each extends between the opposed spanner beams. The spring 65 and carrier 200 combine to provide a sprung assembly, which in some examples can provide additional lumbar support to the seat occupant.

The features or components of the examples shown in FIGS. 3 and 5, or other examples disclosed herein, are not meant to be exclusively independent, as concepts from each example can be incorporated into the other. FIGS. 3 and 5 represent only two of several possibilities of the concepts contemplated.

Figure 6:
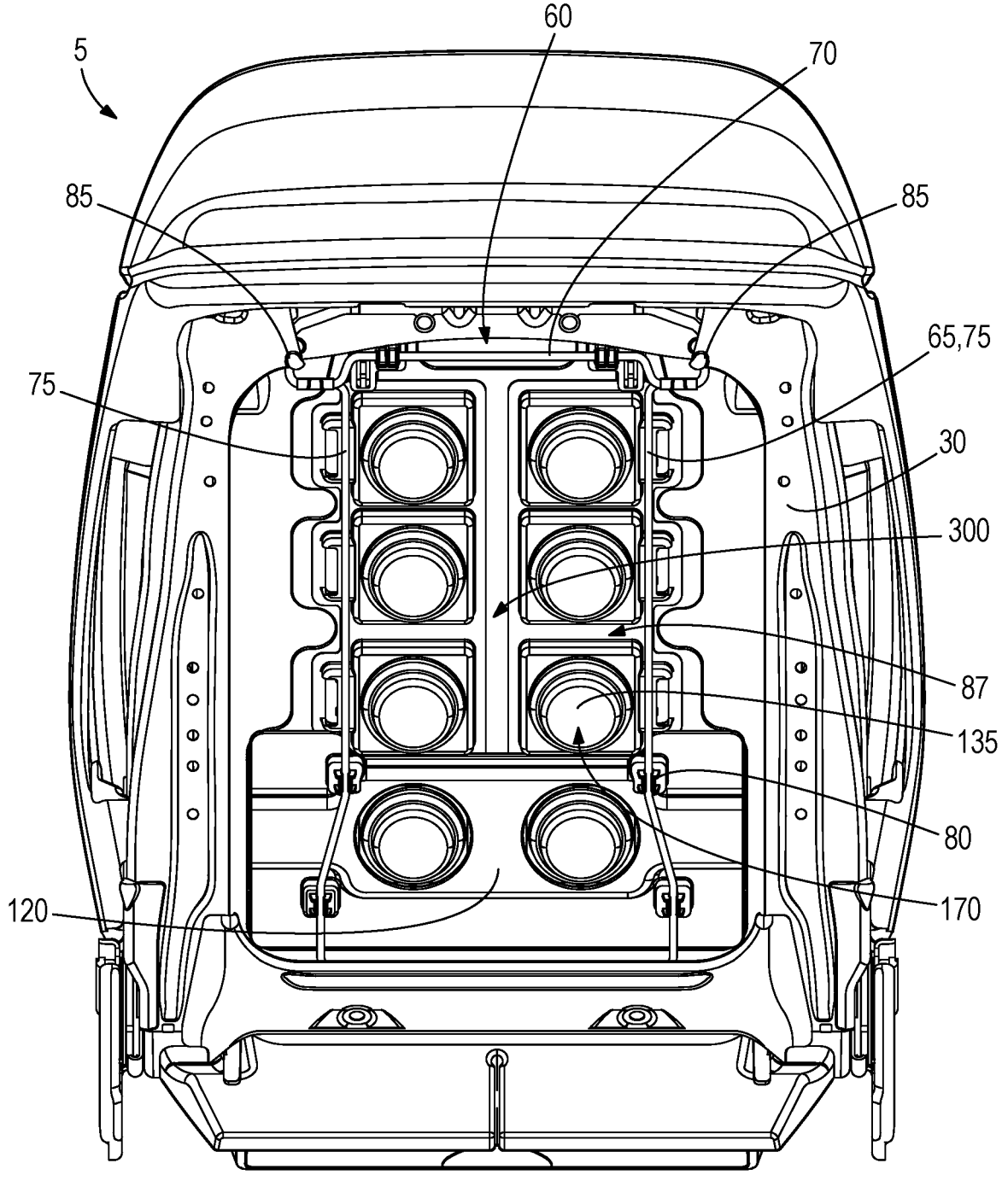
FIG. 6 illustrates a massage system within the seat of FIG. 1 according to some examples.

FIG. 6 illustrates another example of the massage system 60 that can be applied in the seat 5. The view shown in FIG. 6, like that of FIG. 3, is a rear, cut away view of the seat 5 showing the massage system 60. The spring 65, including the spanner beams 75 and the cross beam 70 are substantially the same as that shown in FIG. 3, and as a result the seat frame mounting locations 85 and spring mounting locations 80 are substantially the same as shown in FIG. 3. The example shown in FIG. 6 differs from that shown in FIG. 3 in relation to the structure of the carrier 300.

The carrier 300 includes a plate 87 formed with eight cylindrical projections 135. The cylindrical projections 135 each defines a cavity 170 for receiving an exciter 140. The cylindrical projections 135, and as a result the cavities 170, are positioned in a similar configuration to the eight exciters 140 in the example shown in FIG. 3. The carrier 300 shown in FIG. 6 is flexible such that the plate 87 and cylindrical projections 135 therein can adjust to the body contour of a seated occupant. For example, the carrier 300 is flexible enough to flex from a first contour (when the seat 5 is empty) to a second contour (when the seat 5 is occupied). The carrier 300 has memory, so that the carrier will flex back to the first contour after the seat is no longer occupied.

Figure 7:
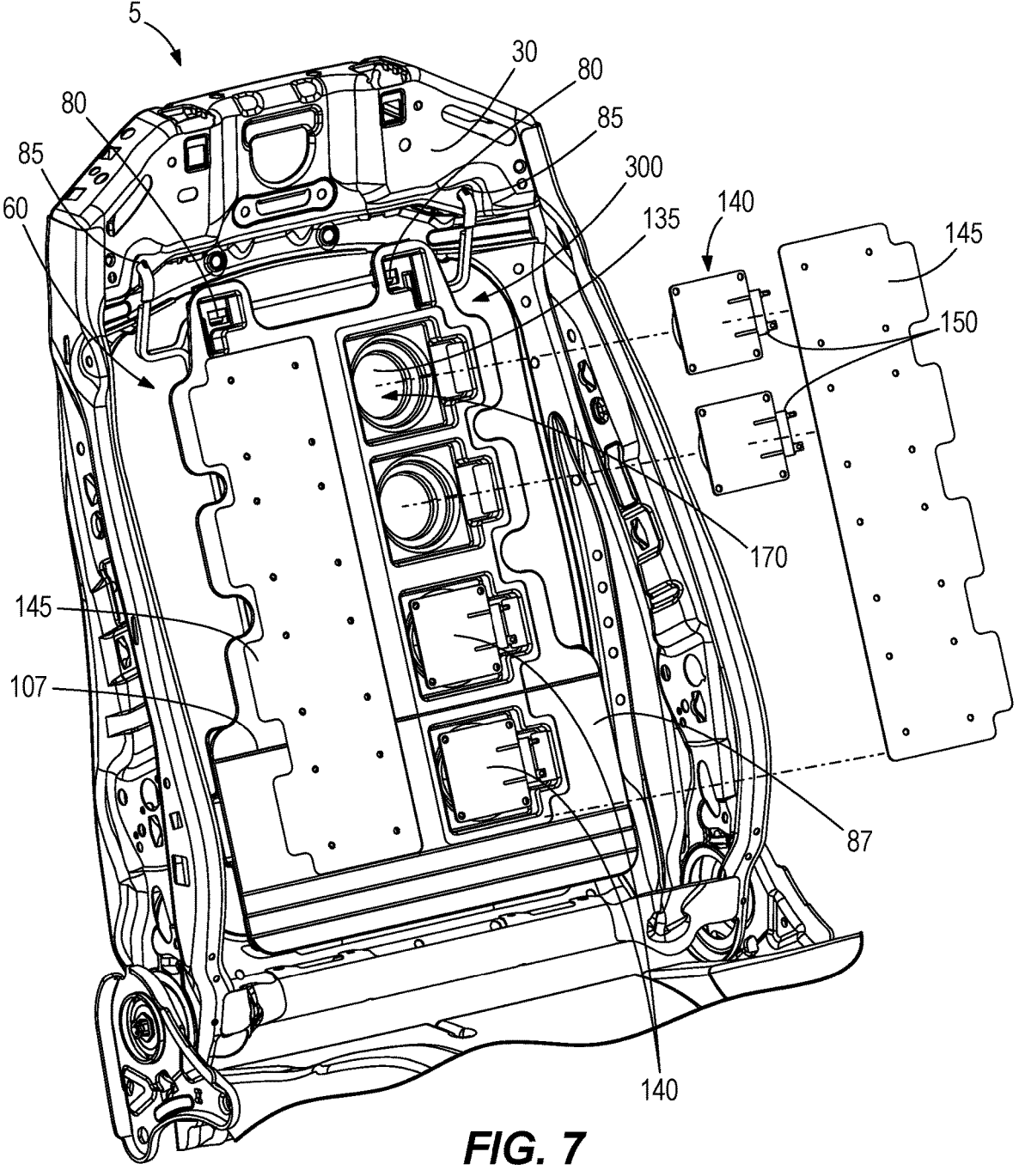
FIG. 7 illustrates an alternate view of the massage system of FIG. 6 according to some examples.
Figures 8, 9:
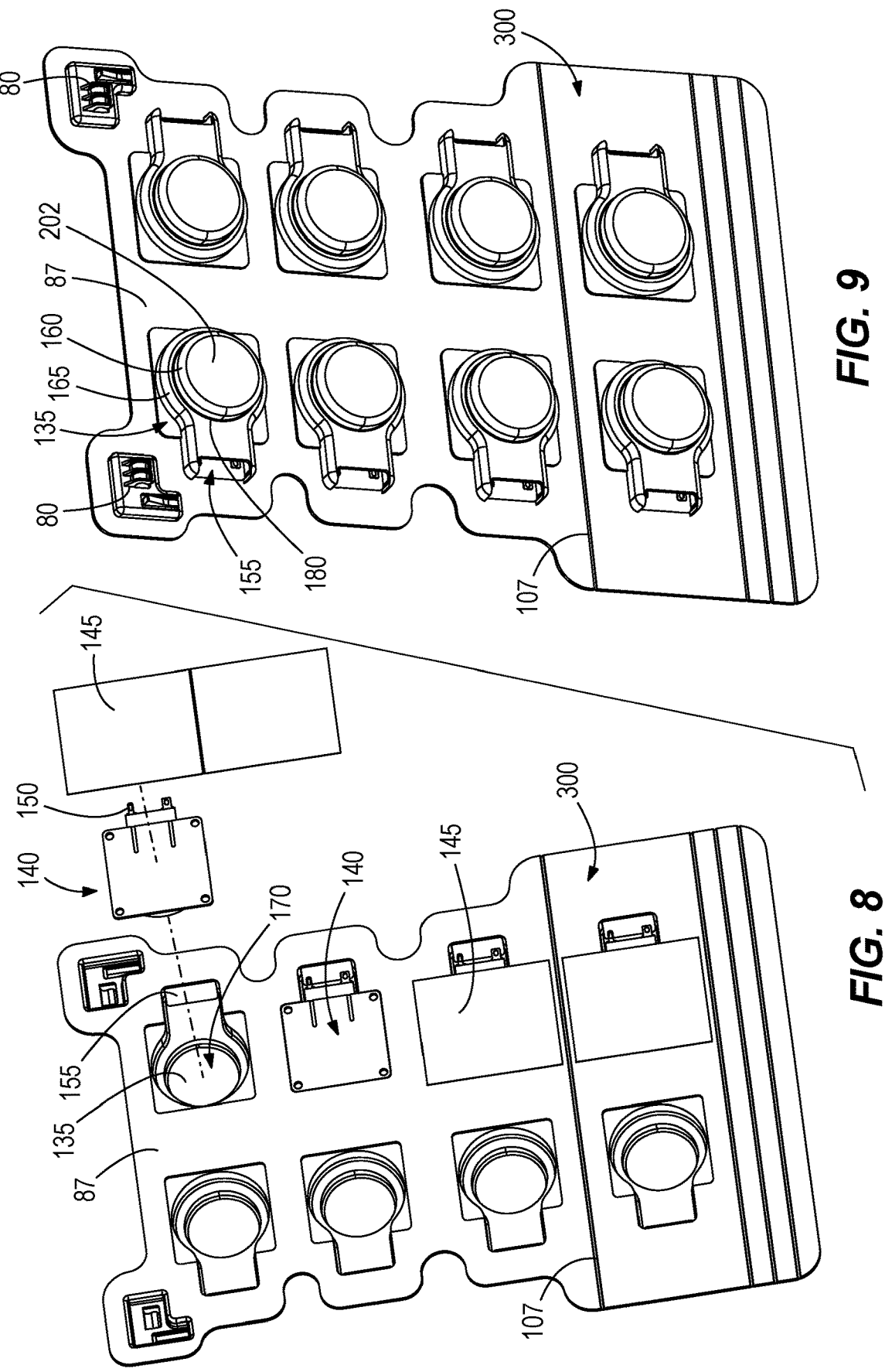
FIG. 8 illustrates a front view of the massage system of FIG. 6 according to some examples.
FIG. 9 illustrates a rear view of the massage system of FIG. 6 according to some examples.

The stiffness and memory of the carrier 300 depends on the type of material used to form the carrier 300. The cylindrical projections 135 provided on the carrier 300 increase the carrier's rigidity compared to a flat plate of the same material. To address this increased rigidity and maintain the flexibility of the carrier 300, a living hinge 107 (FIGS. 7, 9) is provided in the plate 87. Typically, a living hinge is a thin flexible hinge made from the same material as the two more rigid pieces the hinge connects. The living hinge 107 allows the connected more rigid pieces to bend along the line of the hinge. The living hinge in FIGS. 7-9 is located between the third and fourth set of cylindrical projections 135 (as counted from the top of the plate 87 in FIGS. 7-9), but in other examples can be placed in other locations on the plate 87. With this configuration, the carrier 300 is still rigid enough to protect the exciters 140 and prevent compressive forces generated by a seated occupant from adversely affecting the quality or performance of the vibratory output of the exciters 140. In other words, the carrier 300 is rigid enough to prevent the exciters 140 from being damaged or distorted by the compressive forces that may be exerted by a seated occupant in the seat 5. In some examples, the carrier 300 is manufactured from hard rubber or plastic. In other examples, the plate 87 is flexible enough without the living hinge 107 to meet the flexibility requirements needed to provide adequate seated comfort and performance of the massage system 60. In some examples, the carrier 300 can provide the added benefit of being a noise attenuation device, reducing any noise created by the massage system 60.

FIG. 7 illustrates a front view of the seat 5 and the carrier 300. The seat covering and other padding materials are removed in FIG. 7 such that only the seat frame 30 and massage system 60 remain. The dashed lines indicate how the exciters 140 are to be installed in the cavities 170 of the cylindrical projections 135, which extend from plate 87 toward the B-side of the seat 5. Two exciters 140 are shown in their installed positions. In the illustrated example, the exciters 140 are cylindrical-style speakers, although other exciter types could be used. The massage system 60 includes a flexible seal, membrane, or gasket 145, which can be made from rubber or similar material. Each exciter is connected to a seal 145 that is attached to the A-side of the plate 87. Although FIG. 7 illustrates a seal 145 to which four exciters 140 are attached, other numbers of exciters 140 could be attached to a single seal 145. In yet another example as shown in FIG. 8, the seal 145 might only be attached to a single exciter 140.

For example, the seal 145 can include an adhesive on the side facing toward the inside of the cylindrical projection 135 for attachment of an exciter 140. In other examples, the exciter 140 is mechanically affixed to the seal 145 with fasteners. Exciter 140 is thus suspended from the seal 145 within the cavity 170. The flexible nature of the seal 145 acts to "float" the suspended exciter 140 within the cavity 170 such that the exciter 140 is isolated from the rest of the seat 5.

Suspension of the exciters 140 from the seals 145 within the cavities 170 serves to localize and isolate the vibrations generated by each exciter 140 from (or at least lessen the transmission of vibrations to) the vibrations generated by the other exciters 140 and from other components of the massage system 60. Localizing and isolating the vibrations from the individual exciters 140 within each cavity 170 allows the vibrations from each exciter to be targeted to a particular anatomical area of a seated occupant, which can provide a more effective massage experience. The seals 145 also serve to isolate excessive vibration that may be caused by the carrier 300 and thus prevent the resulting noise that would be caused by resonance of the exciters 140 and the carrier 300 from such unwanted vibration.

In some examples, the seal 145 may contact the foam padding of the seat 5, which can increase the massage vibrations felt by the seated occupant. Depending on the material properties of the foam padding, positioning the exciter 140 in direct contact with the foam padding can increase the intensity of the vibrations or can disperse the vibrations throughout the massage area to provide an improved massage experience.

Electronic connections 150 shown in FIGS. 7-8 electrically connect each exciter 140 to a signal source (for example, an analog amplifier controlled by a microprocessor) that provides electrical signals having an amplitude and frequency to cause vibration of an exciter at a desired magnitude and frequency.

The seal or gasket 145 is positioned on the carrier 300 over the installed exciters 140, between the carrier 300 and the seating area. Two seals 145, one for each bank of exciters 140, is shown in FIG. 7, although other cover layouts are contemplated that cover different numbers of the exciters 140.

Figures 10, 11:
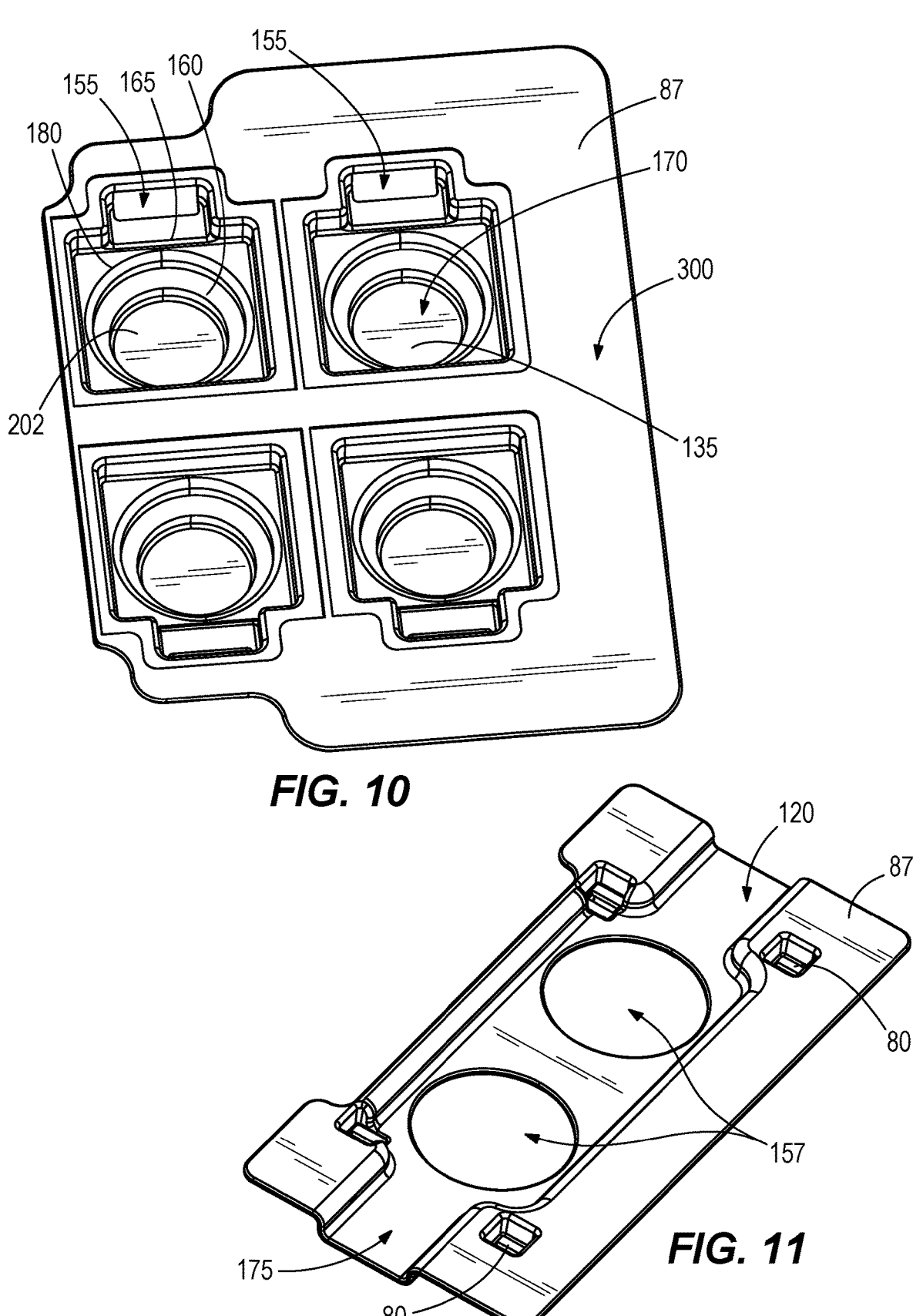
FIG. 10 illustrates an alternate construction of a carrier for the massage system of FIG. 6 according to some examples.
FIG. 11 illustrates a shield of a carrier for the massage system of FIG. 6 according to some examples.

The cavity 170 layout shown in FIGS. 6 and 7 is not the only contemplated example of the carrier 300. FIGS. 8, 9, 10, and 11 show different examples of the carrier 300 that could be installed into a seat 5. Further, the carriers 300 can be installed in different locations in the seat 5. For example, and without limitation, the carrier 300 shown in FIGS. 8 and 9 can be adapted for installation in the backrest 10 as shown in FIG. 6. In another example, without limitation, the carrier 300 as shown in FIG. 10 can be adapted for installation into the seat base 15. Seals 145 shown in FIG. 8 are examples of seals for individual exciters 140 as opposed to the seals 145 for multiple exciters 140 shown in FIG. 7.

FIG. 8 is a front view of the carrier 300 and FIG. 9 is a rear view of the carrier 300. These views illustrate, among other things, the stepped design of the cylindrical projections 135. The cylindrical projections 135 each includes a first portion 160 and a second portion 165. The first portion is cylindrical having a first diameter and the second portion also is cylindrical having a second diameter that is larger than the first diameter. A step 180 extends generally parallel to the plane defined by the plate 87 and connects the first portion 160 to the second portion 165. An end cap 202 extends across the end of the first portion 160 and closes off the cavity 170. In other examples, the end cap 202 is not included, and the cylindrical projection 135 is open and uncapped on both ends.

FIG. 8 also illustrates openings 155 that provide a path for electronic connections 150 from each exciter 140 to other connections in the seat 5 or the vehicle in which the seat 5 is installed. A factor that can adversely impact operation of an exciter-based massage system is exciter overheating, which can cause the exciters, specifically the exciter coils, to fail and render the system inoperable. This can be avoided by ensuring sufficient cooling airflow to the exciters. Ventilating the cavities 170 provides a solution to this operational problem. The openings 155 serve to provide a ventilation path for each exciter 140 to help limit overheating of the exciter coils.

In the example shown in FIGS. 8 and 9, each opening 155 is formed as a partially recessed slot in the plate 87 that extends from the second portion 165. The openings 155 shown in FIGS. 8-10 all extend laterally away from a centerline of the seat 5. In other examples, the openings 155 may be oriented in any direction relative to the seat 5 based on the requirements of the massage system 60 or seat 5.

FIG. 10 illustrates another example of the projections 135 in which the second portion 165 includes a square recessed portion that extends from the plate 87 to the circular, first portion 165, which forms the step 180 with the circular, first portion 160. Like the example in FIGS. 8 and 9, the opening 155 is a slot that extends through the plate 87. The end cap 202 is connected to the first portion 160 and closes off the cavity 170.

FIG. 11 illustrates the shield 120 discussed above, which includes a channel 175. The channel 175 is recessed from the rest of the plate 87 (like the cavities 170 are recessed from to plate 87) to receive two exciters 140. The carrier 300 includes two openings 157 through which the exciters 140 and the projections 90 extend when the plate 87 is depressed toward the B-side under the weight of a seated occupant. While the shield 120 does not support the exciters 140 directly, the shield 120 provides a supportive structure to limit the extent of the deformation of the plate 87 when it is depressed by, for example, a seated occupant. Channel 175 functions in generally the same manner as the projections 135 in the carrier 300 and provides a recessed area for the exciters to protect them from unwanted compressive forces that may be exerted by a seated occupant. The channel 175 also provides a flow path for ventilating and cooling the exciters 140 to help prevent the exciters 140 from overheating.

FIGS. 12-15 illustrate the seat 5 with another example of the massage system 60. More specifically, the massage system 60 includes an individual carrier 400 for each exciter 140 (best shown in FIGS. 13-15) positioned on the seat 5. The carriers 400 may be made from a rigid material, for example plastic, to prevent the supported exciters 140 from being damaged by compressive forces exerted by the seated occupant. In the example shown in FIG. 12, the backrest 10 includes eight exciters 140 each supported by an individual carrier 400 in the backrest seating area 35, and the base 15 includes four exciters 140 each supported by an individual carrier 400 in the base seating area 40. The exciters 140 in this illustration are "flat m" style speakers, such as those marketed by Foster Electric or Dayton Audio, although different speaker styles or exciter styles could be used in other examples. Notably, the exciters 140 are located in the backrest 10 to roughly match the locations of the exciters 140 shown in FIG. 7 and, therefore, provide a similar massage effect or experience to a seated occupant as the massage system of FIG. 7. To install the carriers 400, a core section of foam padding is removed from the seat 5 to provide a space for the massage system 60. The electronic connections extend from the exciters 140 to connect the exciters 140 to other electronic components of the seat 5 or vehicle. After the exciters 140 are installed in the seat 5, a cover (not shown) is placed on the seating areas 35, 40 over the exciters 140, seals 145, and electronic connections 150 so that they are not visible.

Figure 13:
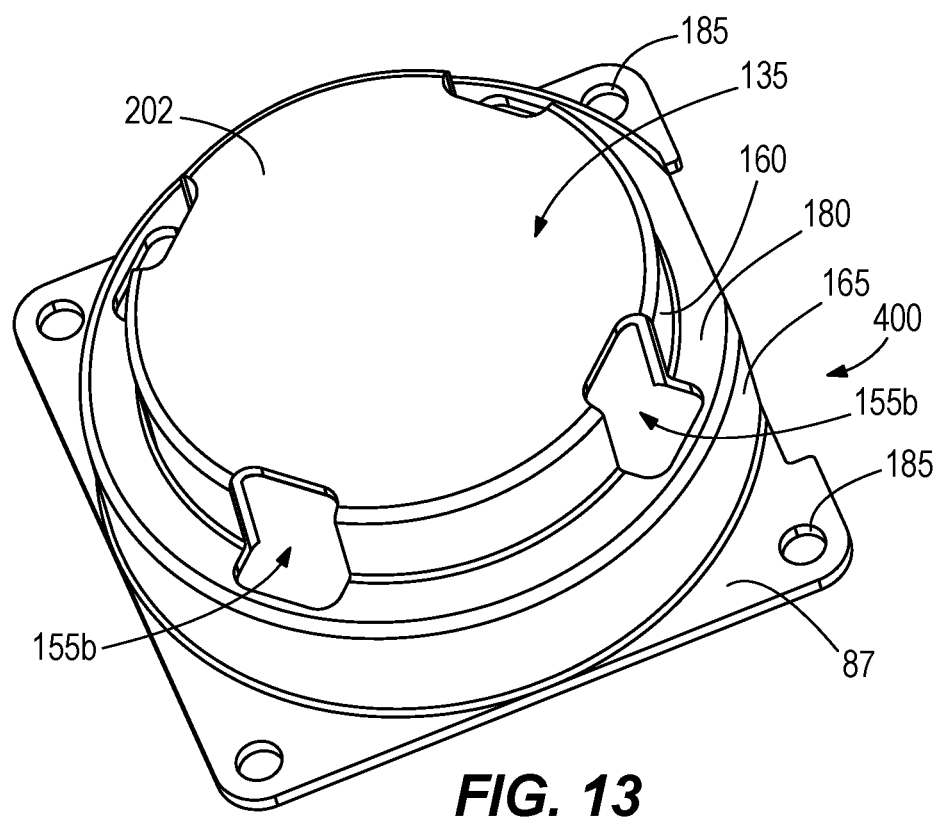
FIG. 13 illustrates a bottom-up view carrier of the massage system of FIG. 12 according to some examples.
Figure 14:
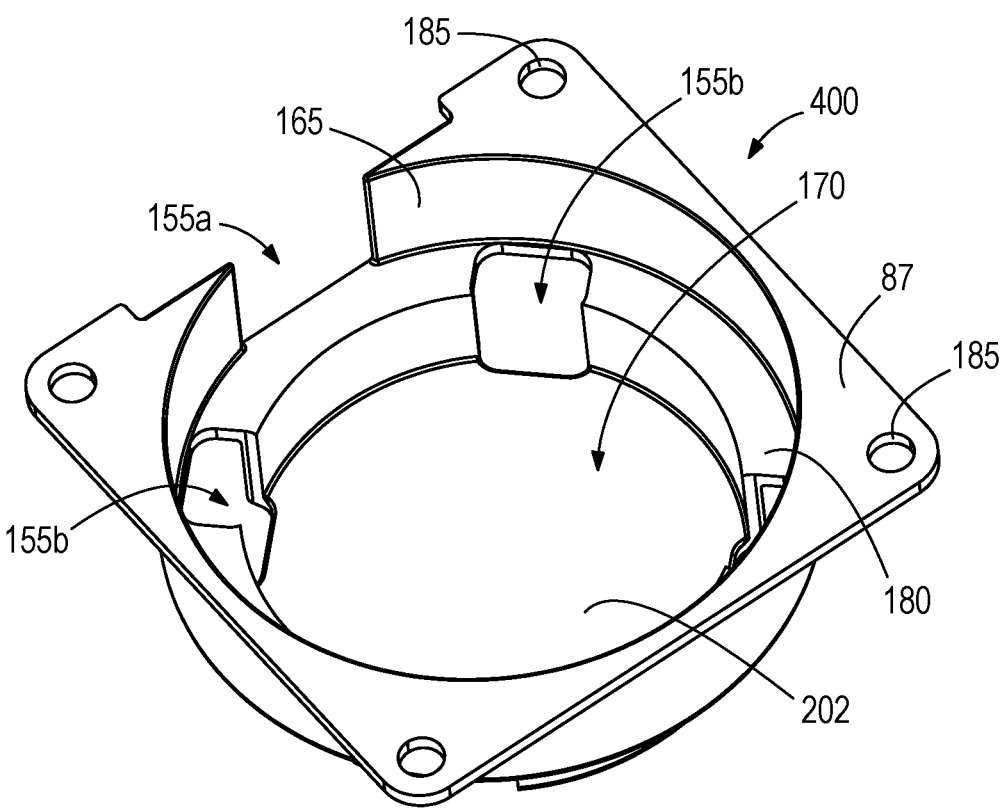
FIG. 14 illustrates a top-down view carrier of the massage system of FIG. 12 according to some examples.

FIGS. 13 and 14 illustrate top-down and bottom-up views of the carrier 400. The carrier 400 includes a plate 87 from which the cylindrical projection 135 extends. Like the carrier shown in FIG. 7, the cylindrical projection 135 includes a first portion 160 and a second portion 165 connected by the step 180. The first portion 160 is closed with the end cap 202. The plate also includes mounting apertures 185 through which fasteners can extend. The mounting apertures 185 are used to fix the flexible seal 145 (from which the exciter 140 is suspended within cavity 170) to the carrier 400. The exciter 140 can, in some examples, be fixed to the seal 145 with an adhesive. In other examples the seal 145 is mechanically coupled to the exciter 140. The cavity 170 in which the exciter 140 is suspended serves to isolate the exciter 140 and the vibrations it generates from the rest of the seat 5 and thus provide a more concentrated and effective massage vibration to the seated occupant. The mounting apertures 185 are also used to mount the carrier 400 to the seat 5, for example directly to the seat frame 30 of the seat 5 or within the seat padding.

Numerous forms of the openings 155 are illustrated. For example, opening 155a extends through the second portion 165, and provides a space though which the electronic connections 150 (not shown in FIGS. 13 and 14) can be routed away from the exciter 140. Openings 155b extend through the first portion 160 and portions of the step 180 and the end cap 202. The openings 155b are generally rectangular shaped with rounded corners and are spaced equally about the circumference of the cylindrical projection 135. The openings 155b are primarily provided for cooling and allow cooling air to access the exciter 140 to keep the exciter 140 from overheating.

Figures 15, 16:
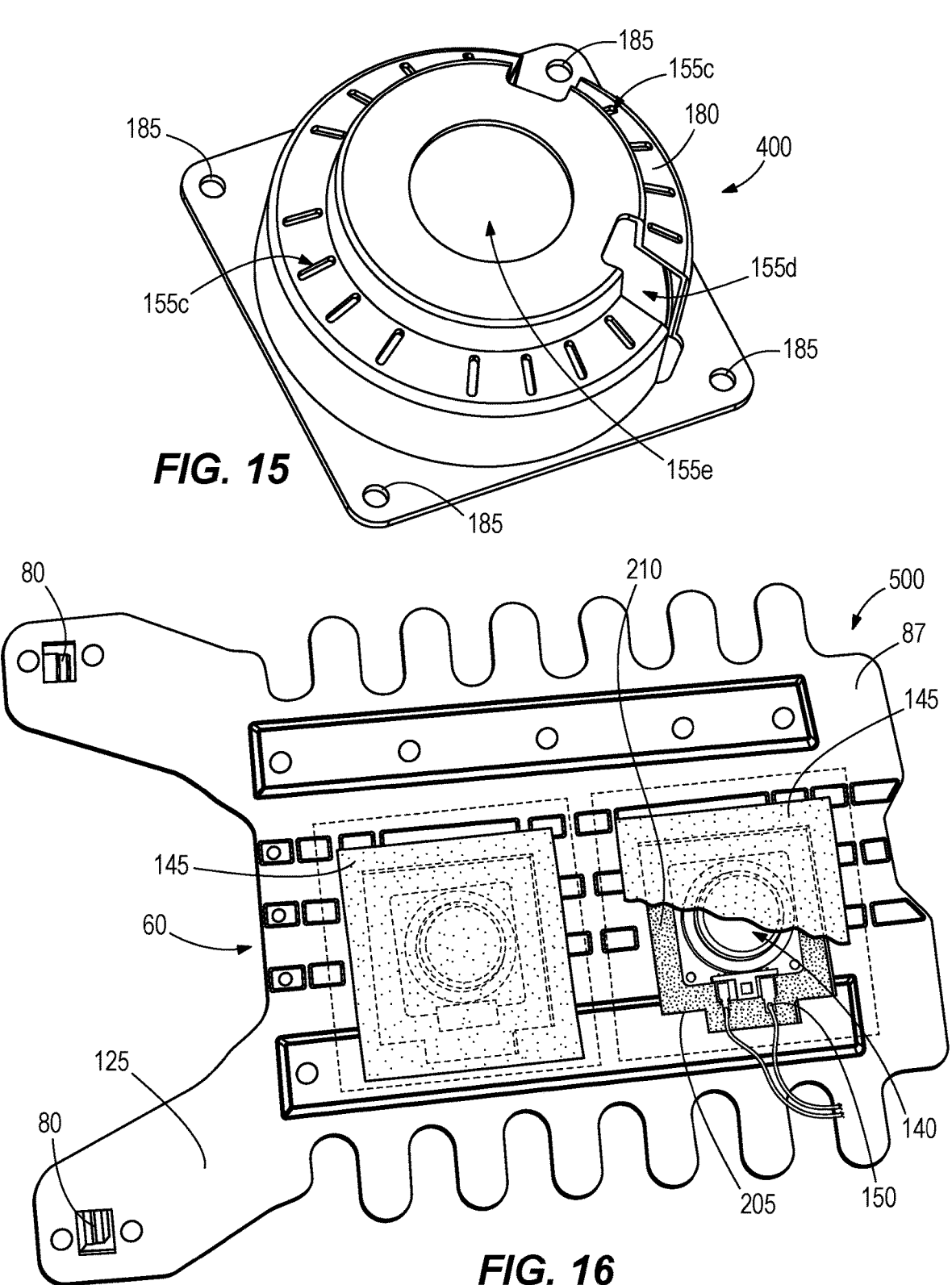
FIG. 15 illustrates a bottom-up view of an alternate construction of a carrier for the massage system of FIG. 12 according to some examples.
FIG. 16 illustrates an alternate construction of a massage system for use within the seat of FIG. 1 according to some examples.

FIG. 15 illustrates a bottom-up of view an alternate construction of the carrier 400 with alternative sizes and locations of the openings 155. Openings 155c are circumferentially spaced around the step 180 in four different groups. The openings 155c are rounded slots oriented such that the longest dimension of the slot extends away from a center of the carrier 400. Openings 155d extend from the plate 87 and through the first and second portions 160, 165, the step 180, and the end cap 202. Two of the openings 155d are shown in FIG. 15, although more or fewer openings 155d can be provided. The openings 155d provide a space where the electronic connections 150 (not shown in FIG. 15) can be routed away from the exciter 140. FIG. 15 also illustrates an opening 155e, which is a circular aperture centered on the generally circular end cap 202. The opening 155e also provides a channel for cooling air that extends to the exciter 140.

FIG. 16 illustrates an alternate construction of the massage system 60 with a carrier 500. The carrier 500 includes a different construction of the plate 87 that has a first mounting bracket 125 and two plate openings 205, although only one of the plate openings is visible in FIG. 16. The first mounting bracket 125 includes two wing portions that extend away from the main body of the plate 87. Each wing portion includes a spring mounting location 80 where the plate 87 is mounted to the spring 65 (not shown in FIG. 16). An exciter 140 is fixed within each plate opening 205 by a seal, gasket, or membrane 145, which in some examples is the same as the seal or gasket 145 shown in FIGS. 7 and 8. The seal 145 is flexible and includes an adhesive on the side facing the inside of the opening 205 for attachment of an exciter 140. In other examples, the exciter 140 is mechanically affixed to the seal 145 with fasteners. Exciter 140 is thus suspended from seal 145 within opening 205. The flexible nature of the seal 145 acts to "float" the suspended exciter 140 within the plate opening 205 such that the exciter 140 is isolated from the rest of the seat 5. This improves performance of the exciter 140 and improves the overall user massage experience.

The seals 145 illustrated in FIG. 16 are square to match the generally square shape of the plate openings 205, although other shapes of the seals 145 and plate openings 205 are contemplated. In some examples, the coil of the exciter 140 that vibrates is adhered directly to the seal 145. Padding 210 can be provided in the plate opening 205 in the empty space around the exciter 140. The padding can serve to further isolate the exciter 140 from the rest of the seat 5 and provide additional padded comfort to a seated occupant.

Figure 17A:
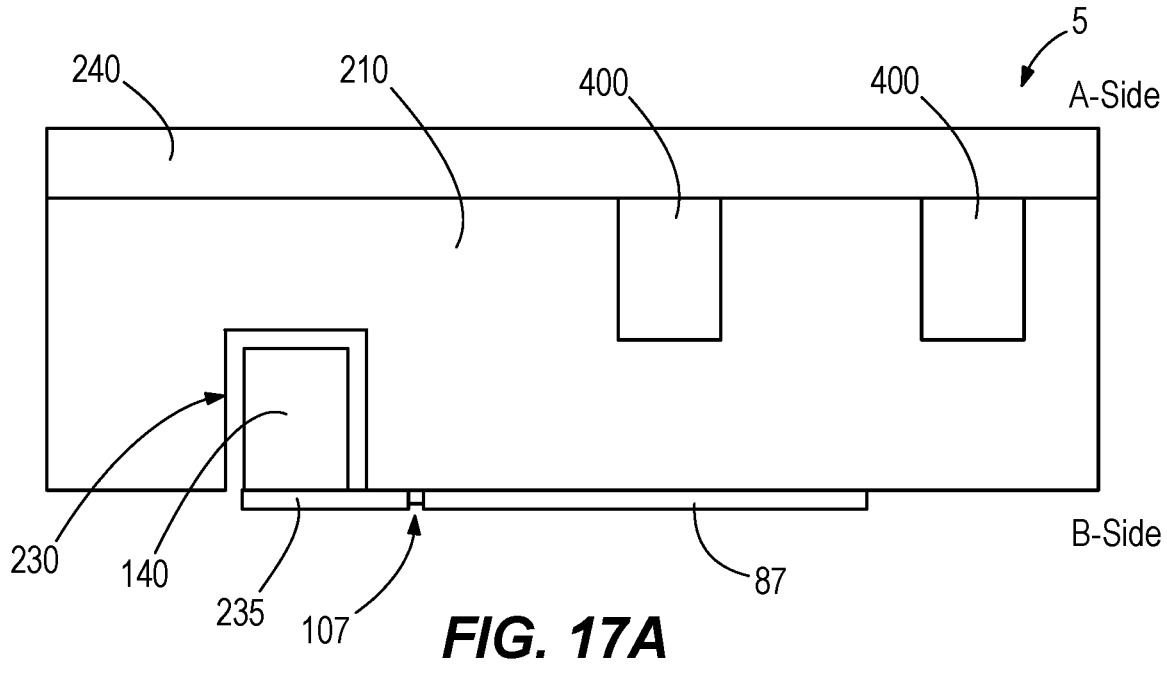
FIG. 17A illustrates an alternate construction of a massage system for use within the seat of FIG. 1 in an undeformed condition according to some examples.
Figure 17B:
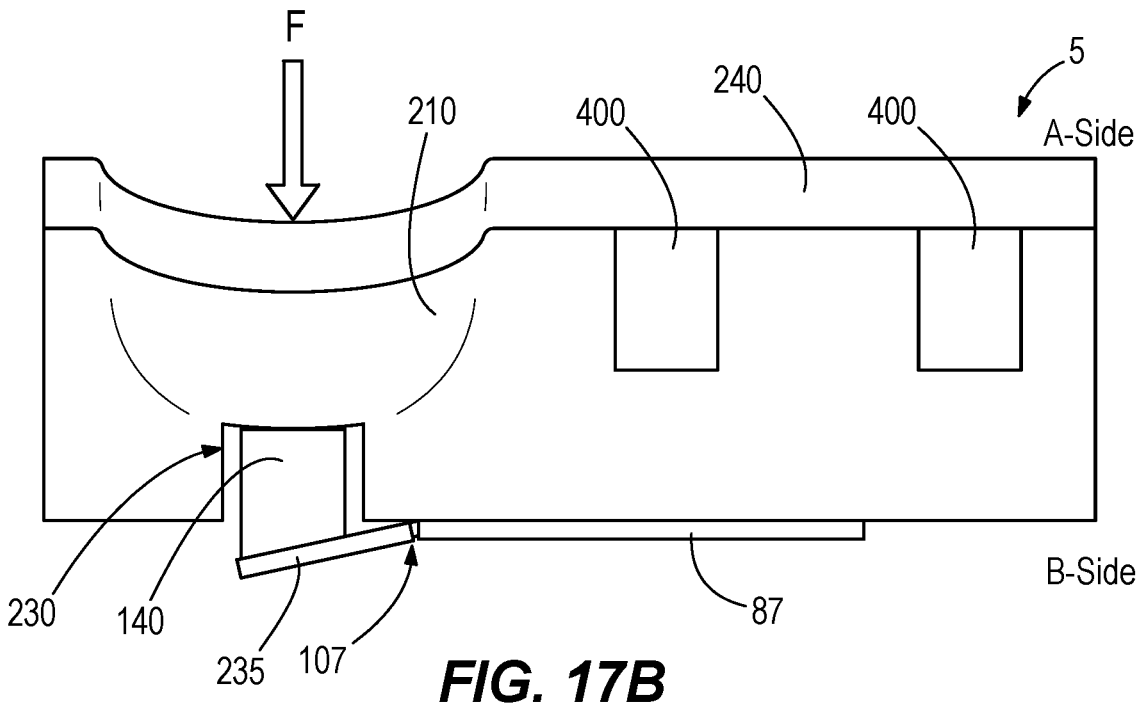
FIG. 17B illustrates the alternate construction of a massage system of FIG. 17A in a deformed condition according to some examples.

FIGS. 17A and 17B illustrate an alternate construction of the massage system 60. Foam padding 210 is shown with, for example, carriers 400 positioned within the foam padding 210 adjacent the A-side of the backrest 10 or the base 15. The A-side of the backrest 10 or the base 15 includes trim 240. The trim 240 can be different in structure from the padding 210. For example, the trim 240 can be more porous than the padding 210 to help circulate ventilated air. Since the A-side surface of the seat 5, especially the trim 240, may already include complex structure, such as heated/ventilated foam, pneumatic bladders and related components for massage, and heating mats, it can be advantageous to install the exciters 140 from the B-side of the padding 210 to avoid interfering with such structure. A cavity 230 is formed within the B-side of the foam padding 210 to receive an exciter 140 positioned on the plate 87. The cavity 230 can extend through the foam padding 210 all the way to the trim 240. In an alternative example, the exciter 140 could be located on a projection 90 of the carrier 100 shown in FIG. 3. When a force F is applied to the foam padding 210, for example when the seat 5 is occupied, the foam padding 210 will deform in the same direction as the force F as illustrated in FIG. 17B. This deformation pushes the exciter 140 into the plate 87, and causes the plate 87 to also deform or deflect in the same direction as the force F.

The plate 87 is configured to deform or deflect so that the exciter will not be damaged or otherwise have its function impaired by exertion of force F as transmitted through the foam padding 210. In addition, the plate 87 and living hinge are configured to provide enough stiffness to maintain the exciter 140 close enough to the seated occupant so that the exciter 140 provides an optimal massage experience even when a force F is exerted. In some examples, the plate 87 includes a living hinge 107 or other seam so that the flexibility of the plate is optimized. For example, in FIGS. 17A and 17B a portion of the plate 235 where the exciter 141 is attached is hinged from the rest of the plate 87. In the illustrated example, a living hinge is created along a hinge line between the plate 235 and the rest of the plate 87 to add flexibility to the plate 87 so that the exciter 140 can move in response to a force F exerted by a seated occupant and remain in an optimal location relative to the seated occupant. In other examples, the plate 87, due to its geometry, mounting scheme, or material properties alone, provides optimum flexibility to retain the exciter 140 in a location desired for optimum performance in response to exertion of a force F.

FIGS. 18A to 20 illustrate yet other constructions of the massage system 60 where, like the construction in FIGS. 17A and 17B, the exciter 140 is positioned in a cavity 170 of a housing 250, where the housing 250 is positioned within the B-side of the foam padding 210, which is an opposite side of the seat 5 from the exterior seat trim 240. Installing the exciters from the B-side can be advantageous because electronic connections to the exciters 140 are more easily installed (the electronic connections do not have to run though the foam padding 210, to the B-side of the seat, to connected with the rest of the electrical system). In addition, installing the exciters 140 from the B-side can help ensure that the exciters stay in position for the life of the vehicle when compared to exciters installed in the A-side of the foam padding 210. Installing the exciters 140 from the B-side can also ease installation because the entire massage system 60 can be attached as a single unit into the B-side of the seat 5.

Figure 18A:
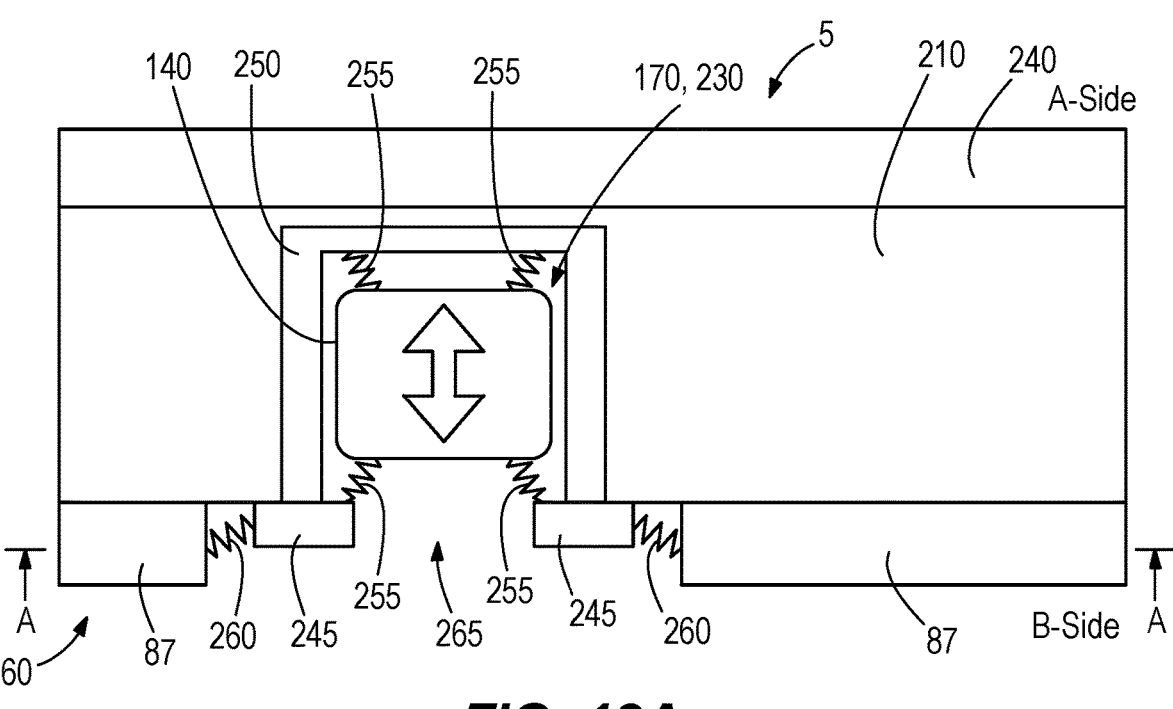
FIG. 18A illustrates an alternate construction of a massage system for use within the seat of FIG. 1 according to some examples.

FIG. 18A illustrates a plate 87 connected to a housing 250. In some examples, the housing 250 is the same as the carrier 400 illustrated in FIGS. 13-15. The housing 250 is inserted into a cavity 230 of the foam padding 210. The housing 250 includes a cavity 170. The housing 250 includes a housing support 245, where the housing support 245 is connected to the plate 87 by springs 260. The exciter 140 is suspended within the housing 250 by springs 255. In the embodiment shown in FIG. 18A, and as best shown in FIG. 18B, the housing support 245 is suspended within a plate opening 265 by four of the springs 260, and the exciter 140 is suspended between the housing support 245 and another portion of the housing 250 by four springs 255 toward the B-side of the housing 250 and four springs 255 toward the A-side of the housing 250.

Figure 18B:
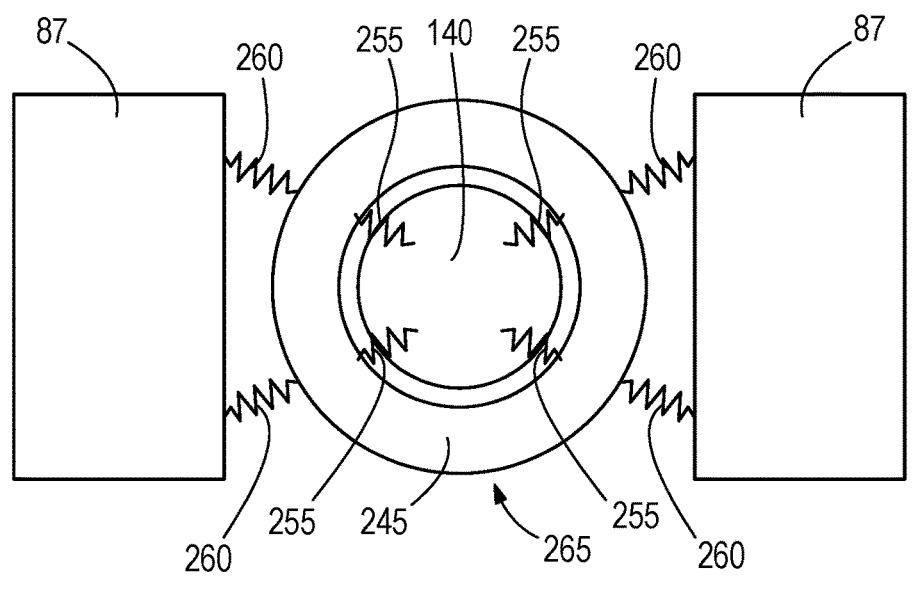
FIG. 18B illustrates a section view of the massage system shown in FIG. 18A taken along section line AA.
Figure 19A:
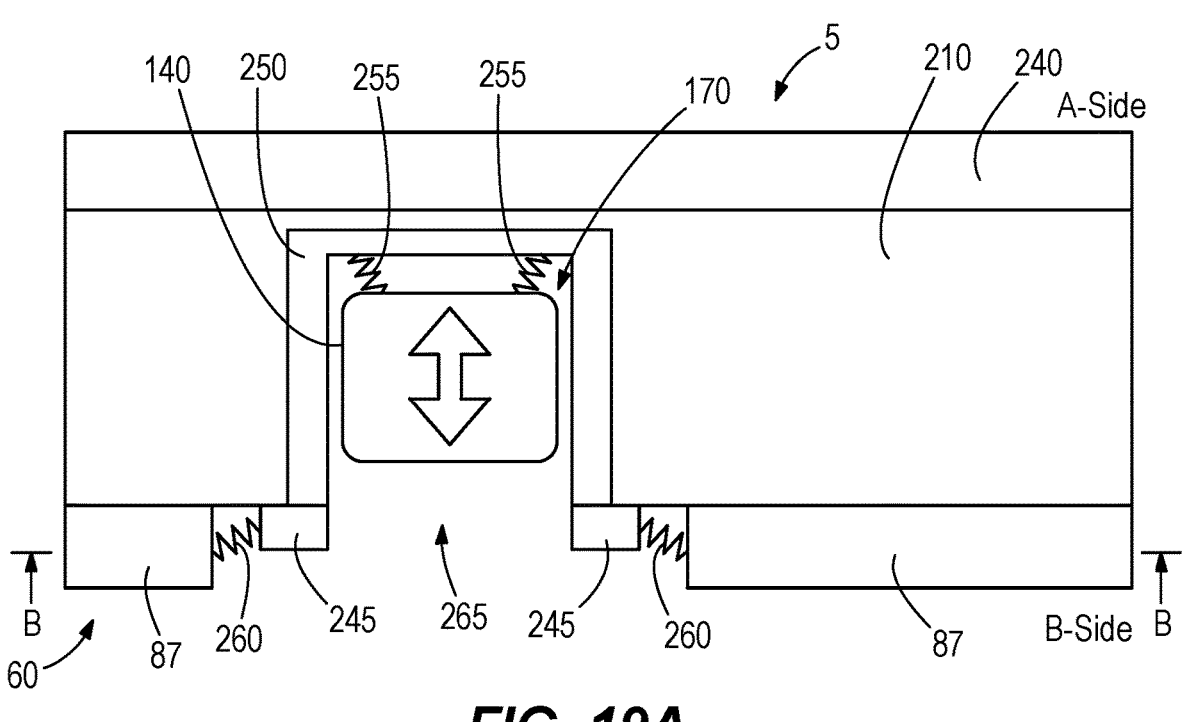
FIG. 19A illustrates an alternate construction of a massage system for use within the seat of FIG. 1 according to some examples.
Figure 19B:
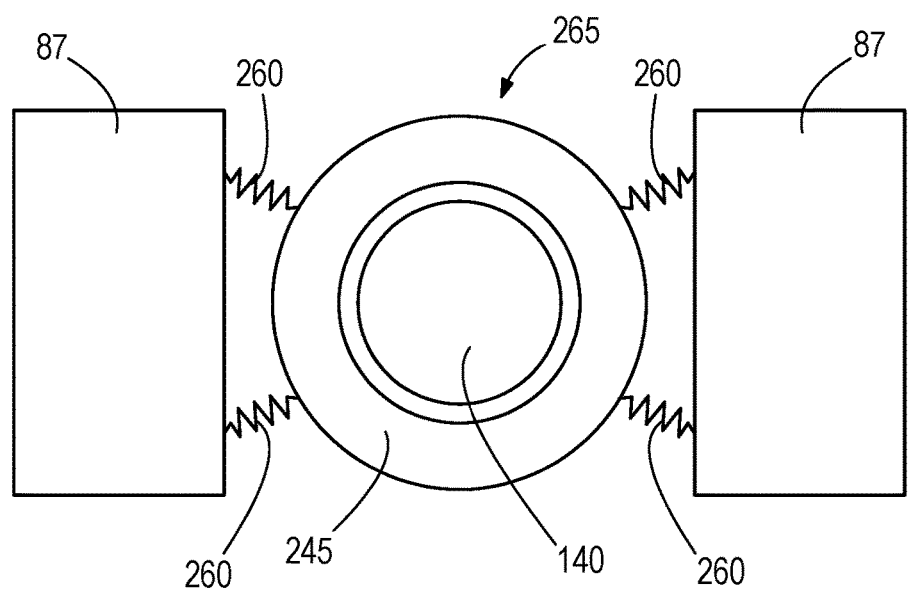
FIG. 19B illustrates a section view of the massage system shown in FIG. 18A taken along section line BB.

FIGS. 19A and 19B illustrate a similar construction of the massage system 60 to that shown in FIGS. 18A and 18B, although with some notable differences. Specifically, the housing support 245 is not connected to the exciter 140 via springs 255, only the portion of the housing 250 adjacent the A-side of the seat 5 is connected to the exciter 140 via springs 255. Like the construction shown in FIGS. 18A and 18B, the housing support 245 is connected to the plate 87 via springs 260. The difference in the configuration of the springs shown in FIGS. 18A and 18B compared to the configuration shown in FIGS. 19A and 19B allows for different overall compression of the foam padding 210 based on the overall design of the seat 5 and can be optimized (via geometry or spring rate of the springs 255, 260) to best retain the exciter 140 relative to a seated occupant to provide an optimal massage experience.

Figure 20:
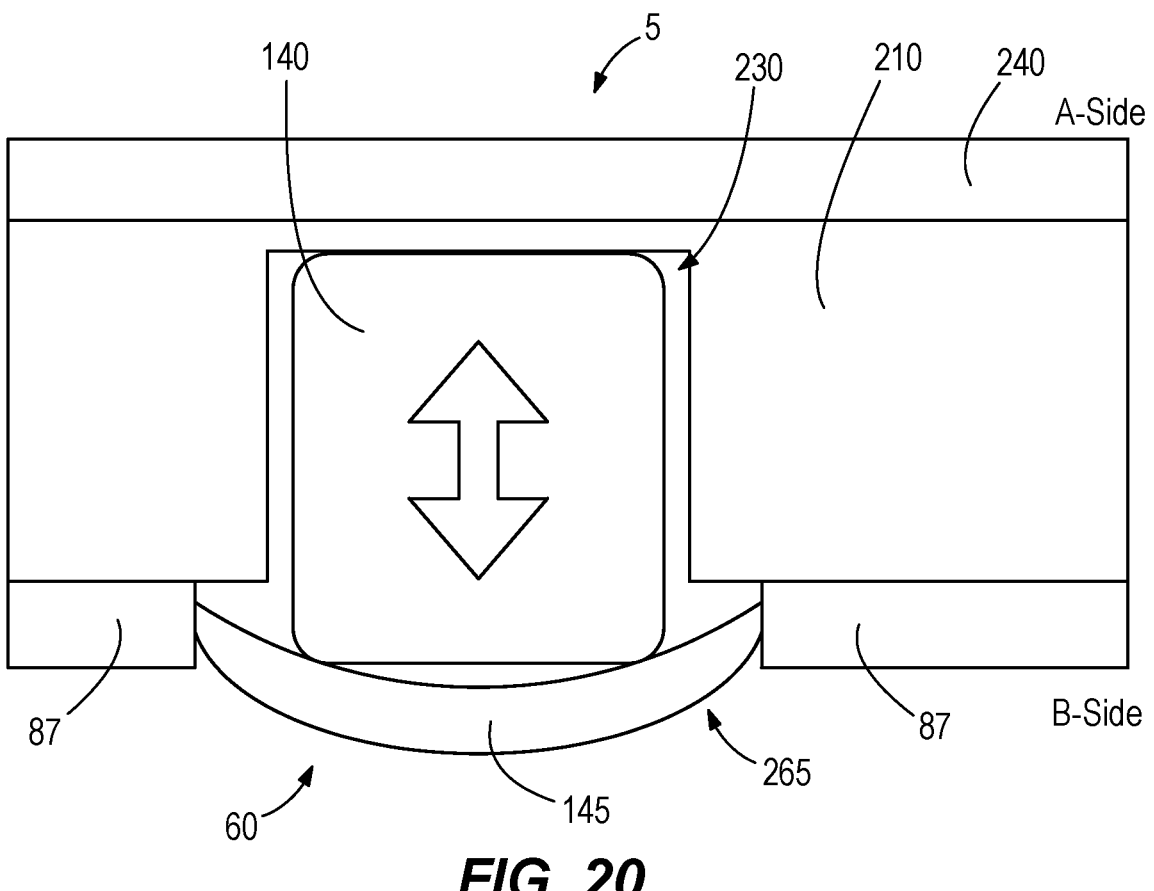
FIG. 20 illustrates an alternate construction of a massage system for use within the seat of FIG. 1 according to some examples.

FIG. 20 illustrates another example of the massage system 60 similar to those shown in FIGS. 18A-19B, although with the difference that no housing 250, no springs 255, 260, and no housing support 245 are included. Instead, a seal or membrane 145 extends across the plate opening 265. The exciter 140 is connected directly to the seal 145 by an adhesive or mechanical fasteners. The exciter 140 extends into the B-side of the foam padding 210 within the cavity 230, and the elasticity of the seal 145 preloads (i.e., biases) the exciter 140 into the cavity 230. In other words, the seal 145 biases the exciter 140 into the cavity 230 and allows the exciter 140 to flex out of the cavity when a seated occupant exerts a force on the exciter 140 in a direction toward the B-side of the seat 5.

In some examples, the springs 255 and the springs 260 may be the same or different and have the same or different spring rates. For example, the springs 255, 260 may be traditional coil springs or formed as membranes or seals similar to the seal 145. While the housing support 245 is shown as being generally circular, the housing support 245, housing 250, and cavity 230 can be other geometric shapes. The cavity 230 and the plate opening 265 can be other shapes to accommodate other sizes and forms of the exciter 140.

The constructions shown in FIGS. 17A, 17B, and 20 all compensate for the removal of the foam padding 210, and resulting lack of the cushioning effect the padding provides, to make room for the cavities to house exciter 140 and its housing 250 by adjusting the spring rate of springs 255 or, in the case of the arrangement of FIG. 20, the biasing force of the seal or membrane 145 so that the springs 255 or seal 145, as the case may be, provide an appropriate cushioning effect in the place of the removed padding 210. That is, the springs 255 or seal 145 will behave in the same manner as the removed padding 210 to cushion a seated occupant and protect the exciters 140 from compressive forces exerted by the occupant. Thus, to compensate for the removal of the foam padding where the exciters 140 are placed, numerous factors are taken into account such as the seat 5 intended spring rate, the flexibility and configuration of the plate 87 (if any), the spring rate of the springs 255, 260 or seal 145

(if any), and the overall seat 5 geometry. Including the geometry of the exciters themselves.

In one aspect, an assembly for massaging an occupant of a seat includes an exciter having a coil for creating a vibration, and a carrier for supporting the exciter within the seat, the carrier being configured to isolate the coil from forces exerted on the seat by the occupant of the seat.

In another aspect, which is combinable with any other aspect, the carrier includes a plate and a cylindrical projection extending away from the plate, the plate and the cylindrical projection defining a cavity, and the exciter being positioned within the cavity.

In yet another aspect, which is combinable with any other aspect, the cylindrical projection includes a first portion with a first diameter, a second portion with a second diameter that is different than the first diameter, and the first portion and the second portion are joined to form a step along the cylindrical projection.

In yet another aspect, which is combinable with any other aspect, the cylindrical projection includes a closed face at a first end, and the exciter is positioned at a second end opposite the first end.

In yet another aspect, which is combinable with any other aspect, the cylindrical projection includes an opening within at least one selected from the group consisting of the first portion, the second portion, and the closed face, and the opening is configured to provide airflow to the exciter.

In yet another aspect, which is combinable with any other aspect, the assembly is located in at least one selected from the group consisting of a base of the seat and a back of the seat.

In yet another aspect, which is combinable with any other aspect, the carrier includes: a spine, a first mounting bracket at a first end of the spine, a second mounting bracket at a second end of the spine that is opposite the first end of the spine, and a plurality of flexible projections spaced along the spine, each of the plurality of projections includes a mounting region spaced apart from the spine, and the exciter is attached to the mounting region of one of the plurality of projections.

In yet another aspect, which is combinable with any other aspect, the exciter is one of a plurality of exciters, and each of the plurality of exciters is attached to a respective projection of the plurality of projections.

In yet another aspect, which is combinable with any other aspect, the assembly includes a spring where the spine, plurality of projections, and plurality of exciters are located between opposite sides of the spring, the spring being fastened to the first mounting bracket and the second mounting bracket, and the spring being configured to be attached to a frame of the seat.

In yet another aspect, which is combinable with any other aspect, the seat includes a seating area for receiving a seated occupant, the assembly being located in at least one selected from the group consisting of a base of the seat and a back of the seat, the spring being positioned on the frame such that the spine and the plurality of exciters are located between the spring and the seating area, and the plurality of exciters being located between the plurality of projections and the seating area.

In yet another aspect, which is combinable with any other aspect, the seating area is adjustable between a first contour and a second contour, and the spring and the plurality of projections are flexible such that the plurality of exciters are adjustable between the first contour and the second contour to match the seating area.

In yet another aspect, which is combinable with any other aspect, the exciter is one of a plurality of exciters, the carrier comprises a plate and a plurality of cylindrical projections extending away from the plate, and each of the plurality of exciters is positioned within a respective cavity of each of the plurality of cylindrical projections.

In yet another aspect, which is combinable with any other aspect, each cylindrical projection includes a first portion with a first diameter, a second portion with a second diameter that is different than the first diameter, and the first portion and the second portion are joined to form a step along the cylindrical projection.

In yet another aspect, which is combinable with any other aspect, each cylindrical projection includes an opening within at least one selected from the group consisting of the first portion and the second portion, and the opening is configured to provide airflow to the respective exciter of the plurality of exciters.

In yet another aspect, which is combinable with any other aspect, the assembly includes a spring, the spring including a cross beam and a spanner beam, the cross beam being attached to an upper portion of a back side of the plate, the spanner beam being attached to a mid-portion and to a lower portion of the back side of the plate, the mid-portion being located between the upper portion and the lower portion on the back side of the plate, the cross beam and the spanner beam surrounding the plurality of cylindrical projections, and the spring being configured to be attached to a frame of the seat.

In yet another aspect, which is combinable with any other aspect, the seat includes a seating area for receiving a seated occupant, the assembly is located in at least one selected from the group consisting of a base of the seat and a back of the seat, and the spring is positioned on the frame such that the plate is located between the spring and the seating area.

In yet another aspect, which is combinable with any other aspect, the seating area is adjustable between a first contour and a second contour, and the spring and the plate are flexible such that the plurality of exciters are adjustable between the first contour and the second contour to match the seating area.

In yet another aspect, which is combinable with any other aspect, the carrier comprises an opening, the assembly further includes a seal, and the exciter is supported within the opening by the seal.

In yet another aspect, which is combinable with any other aspect, the seal is coupled to the carrier and extends across the opening, and the exciter is coupled to the seal within the opening.

In yet another aspect, which is combinable with any other aspect, the exciter is a first exciter and the carrier comprises two or more openings, the assembly further includes a seal and a second exciter, and the seal extends across the two or more openings, supports the first exciter in one of the two or more openings, and supports the second exciter in another of the two or more openings.

In yet another aspect, which is combinable with any other aspect, the carrier includes a plate, a first portion of the plate being connected to a second portion of the plate by a living hinge, and the exciter being connected to the first portion of the plate.

In yet another aspect, which is combinable with any other aspect, the seat includes foam padding positioned along a side of the carrier, the foam padding includes a cavity, and the exciter is positioned on the first portion of the plate such that the exciter extends into the cavity.

In yet another aspect, which is combinable with any other aspect, the living hinge is configured such that, when a force is applied to the foam padding toward the exciter, the first portion of the plate will deflect away from the foam padding.

In yet another aspect, which is combinable with any other aspect, the plate and the living hinge are configured such that, when the force is applied to the foam padding toward the exciter, the living hinge is configured to maintain the exciter adjacent the foam padding such that the exciter provides a massage experience to the occupant of the seat.

In yet another aspect, which is combinable with any other aspect, the seat includes foam padding positioned along a side of the carrier, the foam padding includes a cavity, and the exciter is attached to the carrier and extends into the cavity.

In yet another aspect, which is combinable with any other aspect, the carrier is configured such that, when a force is applied to the foam padding toward the exciter, the carrier deflects away from the foam padding.

In yet another aspect, which is combinable with any other aspect, the carrier is configured such that, when the force is applied to the foam padding toward the exciter, the exciter is maintained adjacent the foam padding to provide a massage experience to the occupant of the seat.

In yet another aspect, which is combinable with any other aspect, the seat includes foam padding positioned along a side of the carrier, the foam padding includes a cavity, a housing is positioned within the cavity, and the exciter is positioned in the housing.

In yet another aspect, which is combinable with any other aspect, the housing includes an opening, the opening facing away from the foam padding.

In yet another aspect, which is combinable with any other aspect, the housing includes a housing support positioned around the opening of the housing, the housing support being connected to the carrier by at least one spring that is configured to allow relative movement between the carrier and the housing.

In yet another aspect, which is combinable with any other aspect, the housing includes a housing support positioned around the opening of the housing, the housing support being connected to the carrier by four springs that are configured to allow relative movement between the carrier and the housing.

In yet another aspect, which is combinable with any other aspect, the exciter is connected to the housing by at least one spring such that the exciter is suspended within the housing and such that the at least one spring is configured to allow relative movement between the exciter and the housing.

In yet another aspect, which is combinable with any other aspect, the exciter is connected to the housing by four springs such that the exciter is suspended within the housing and such that the four springs are configured to allow relative movement between the exciter and the housing.

In yet another aspect, which is combinable with any other aspect, the housing includes an A-side and a B-side opposite the A-side, the B-side of the housing including the opening, and at least one spring connects the exciter to the A-side of the housing such that the exciter is suspended within the housing.

In yet another aspect, which is combinable with any other aspect, the B-side of the housing includes a housing support around the opening of the housing, and at least one spring connects the exciter to the housing support such that the exciter is suspended within the housing.

In yet another aspect, which is combinable with any other aspect, the exciter is connected to the housing only at the A-side of the housing.

In yet another aspect, which is combinable with any other aspect, the housing includes an A-side and a B-side opposite the A-side, the B-side of the housing including the opening, and four springs connect the exciter to the A-side of the housing such that the exciter is suspended within the housing.

In yet another aspect, which is combinable with any other aspect, the B-side of the housing includes a housing support around the opening of the housing, and four springs connect the exciter to the housing support such that the exciter is suspended within the housing.

In yet another aspect, which is combinable with any other aspect, the carrier includes an opening, and a seal extends across the opening and supports the exciter within the opening such that the exciter extends into foam padding of the seat.

In yet another aspect, which is combinable with any other aspect, the exciter is bonded to the seal with an adhesive.

In yet another aspect, which is combinable with any other aspect, the seal is elastic, the elasticity of the seal biases the exciter into the foam padding of the seat, and the seal is configured such that the exciter flexes out of the foam padding of the seat when a force is applied to the foam padding by the occupant of the seat.

In yet another aspect, which is combinable with any other aspect, the carrier is located on a B-side of the seat, the foam padding is located between the B-side of the seat and an A-side of the seat, and, when a force is applied to the A-side of the seat by the occupant of the seat, the seal is configured to flex the exciter in a direction from the A-side of the seat to the B-side of the seat.

Although certain embodiments, examples, features, and aspects have been described and illustrated, variations and modifications exist within the scope and spirit of the subject matter explained and shown.

What is claimed is:

1. An assembly for massaging an occupant of a seat, the assembly comprising:
    an exciter having a coil for creating a vibration, and
    a carrier for supporting the exciter within the seat, the carrier configured to isolate the coil from forces exerted on the seat by the occupant of the seat,
    wherein the carrier comprises a plate and a cylindrical projection extending away from the plate,
    wherein the plate and the cylindrical projection define a cavity, and
    wherein the exciter is positioned within the cavity.

2. The assembly of claim 1, wherein the cylindrical projection includes a first portion with a first diameter, a second portion with a second diameter that is different than the first diameter, and wherein the first portion and the second portion are joined to form a step along the cylindrical projection.

3. The assembly of claim 2, wherein the cylindrical projection includes a closed face at a first end, and wherein the exciter is positioned at a second end opposite the first end.

4. The assembly of claim 3, wherein the cylindrical projection includes an opening within at least one selected from the group consisting of the first portion, the second portion, and the closed face, and wherein the opening is configured to provide airflow to the exciter.

5. A seat including the assembly of claim 1, wherein the assembly is located in at least one selected from the group consisting of a base of the seat and a back of the seat.

6. An assembly for massaging an occupant of a seat, the assembly comprising:
    an exciter having a coil for creating a vibration, and
    a carrier for supporting the exciter within the seat, the carrier configured to isolate the coil from forces exerted on the seat by the occupant of the seat, wherein the carrier comprises:
    a spine,
    a first mounting bracket at a first end of the spine,
    a second mounting bracket at a second end of the spine that is opposite the first end of the spine, and
    a plurality of flexible projections spaced along the spine,
    wherein each of the plurality of projections includes a mounting region spaced apart from the spine, and
    wherein the exciter is attached to the mounting region of one of the plurality of projections.

7. The assembly of claim 6, wherein the exciter is one of a plurality of exciters,
    and wherein each of the plurality of exciters is attached to a respective projection of the plurality of projections.

8. The assembly of claim 7, further comprising a spring, wherein the spine, plurality of projections, and plurality of exciters are located between opposite sides of the spring,
    wherein the spring is fastened to the first mounting bracket and the second mounting bracket, and
    wherein the spring is configured to be attached to a frame of the seat.

9. A seat including the assembly of claim 8, wherein the seat includes a seating area for receiving a seated occupant,
    wherein the assembly is located in at least one selected from the group consisting of a base of the seat and a back of the seat,
    wherein the spring is positioned on the frame such that the spine and the plurality of exciters are located between the spring and the seating area, and
    wherein the plurality of exciters is located between the plurality of projections and the seating area.

10. The seat of claim 9, wherein the seating area is adjustable between a first contour and a second contour, and
    wherein the spring and the plurality of projections are flexible such that the plurality of exciters are adjustable between the first contour and the second contour to match the seating area.

11. The assembly of claim 1, wherein the exciter is one of a plurality of exciters,
    wherein the cylindrical projection is one of a plurality of cylindrical projections extending away from the plate, and
    wherein each of the plurality of exciters is positioned within a respective cavity of each of the plurality of cylindrical projections.

12. The assembly of claim 11, wherein each cylindrical projection includes a first portion with a first diameter, a second portion with a section diameter that is different than the first diameter, and
    wherein the first portion and the second portion are joined to form a step along the cylindrical projection.

13. The assembly of claim 12, wherein each cylindrical projection includes an opening within at least one selected from the group consisting of the first portion and the second portion, the opening configured to provide airflow to the respective exciter of the plurality of exciters.

14. The assembly of claim 13, further comprising a spring, wherein the spring includes a cross beam and a spanner beam, wherein the cross beam is attached to an upper portion of a back side of the plate, wherein the spanner beam is attached to a mid-portion and to a lower portion of the back side of the plate, the mid-portion being located between the upper portion and the lower portion on the back side of the plate, wherein the cross beam and the spanner beam surround the plurality of cylindrical projections, and wherein the spring is configured to be attached to a frame of the seat.

15. A seat including the assembly of claim 14, wherein the seat includes a seating area for receiving a seated occupant, wherein the assembly is located in at least one selected from the group consisting of a base of the seat and a back of the seat, and wherein the spring is positioned on the frame such that the plate is located between the spring and the seating area.

16. The seat of claim 15, wherein the seating area is adjustable between a first contour and a second contour, and wherein the spring and the plate are flexible such that the plurality of exciters are adjustable between the first contour and the second contour to match the seating area.

17. An assembly for massaging an occupant of a seat, the assembly comprising:

an exciter having a coil for creating a vibration, a carrier for supporting the exciter within the seat and having an opening configured to receive the exciter, the carrier configured to isolate the coil from forces exerted on the seat by the occupant of the seat, and a membrane configured for coupling to the carrier such that the membrane extends across the opening for suspending the exciter from the opening, wherein the membrane is configured to be connected to the exciter within the opening.

18. The assembly of claim 1, wherein the exciter is a first exciter and the carrier comprises two or more openings, wherein the assembly further includes a seal and a second exciter, and wherein the seal extends across the two or more openings and supports the first exciter in one of the two or more openings and supports the second exciter in another of the two or more openings.

* * * * *